United States Patent [19]  
Matsunaga et al.

[11] Patent Number: 5,142,475  
[45] Date of Patent: Aug. 25, 1992

[54] A SYSTEM FOR CONTROLLING DAMPING FORCE OF SHOCK ABSORBERS BY ADAPTIVELY ADJUSTING THE DESIRED ACCELERATION EXPANSION/CONTRACTION OF THE SHOCK ABSORBERS

[75] Inventors: Eiju Matsunaga; Makoto Shiozaki, both of Kariya; Yutaka Suzuki, Nishio; Masatoshi Kuroyanagi, Kariya; Toshinobu Ishida, Okazaki, all of Japan

[73] Assignees: Nippondenso Co., Ltd., Kariya; Nippon Soken, Inc., Nishio, both of Japan

[21] Appl. No.: 391,283

[22] Filed: Aug. 9, 1989

[51] Int. Cl.⁵ .............................................. B60G 17/01
[52] U.S. Cl. .............................. 364/424.05; 280/707; 280/840
[58] Field of Search ................... 364/424.05; 280/707, 280/840; 180/41

[56] References Cited

U.S. PATENT DOCUMENTS

| 4,520,289 | 5/1985 | Sato et al. ............................ 310/316 |
| 4,664,409 | 3/1987 | Nakashima et al. ................. 280/707 |
| 4,666,180 | 5/1987 | Shirakuma ........................... 280/707 |
| 4,673,194 | 6/1987 | Sugasawa ......................... 364/424.05 |
| 4,717,172 | 1/1988 | Asami et al. ........................ 280/707 |
| 4,717,173 | 1/1988 | Sugasawa et al. .................. 280/707 |
| 4,729,459 | 3/1988 | Inagaki et al. ...................... 188/299 |
| 4,741,554 | 5/1988 | Okamoto ........................ 280/707 X |
| 4,805,101 | 2/1989 | Dietrich et al. ................. 364/424.05 |
| 4,821,189 | 4/1989 | Hennecke et al. ............. 364/424.05 |
| 4,852,903 | 8/1989 | Tanaka et al. ................... 280/707 X |
| 4,861,068 | 9/1989 | McCabe .............................. 280/707 |
| 4,872,701 | 10/1989 | Akatsu et al. ...................... 280/703 |
| 4,907,154 | 3/1990 | Yasuda et al. .................. 364/424.05 |
| 4,909,536 | 3/1990 | Hale ...................................... 280/707 |
| 4,948,163 | 8/1990 | Kikushima et al. ................. 280/707 |
| 4,948,166 | 8/1990 | Kaneko ................................ 280/707 |
| 4,970,645 | 11/1990 | Adachi et al. ................. 364/424.05 |
| 4,984,820 | 1/1991 | Uchiyama et al. ................ 280/707 |
| 4,989,148 | 1/1991 | Gurke et al. ................... 364/424.05 |
| 5,015,007 | 5/1991 | Uchiyama et al. ................ 280/707 |
| 5,034,890 | 7/1991 | Sugasawa et al. ............. 364/424.05 |

FOREIGN PATENT DOCUMENTS

| 0139145 | 5/1985 | European Pat. Off. . |
| 0151421 | 8/1985 | European Pat. Off. . |
| 0157181 | 10/1985 | European Pat. Off. . |
| 0285153 | 10/1988 | European Pat. Off. . |
| 0311114 | 4/1989 | European Pat. Off. . |
| 3518503 | 10/1986 | Fed. Rep. of Germany . |
| 59-227515 | 12/1984 | Japan . |
| 60-151108 | 8/1985 | Japan . |
| 61-1518 | 1/1986 | Japan . |
| 61-18513 | 1/1986 | Japan . |
| 62-80111 | 4/1987 | Japan . |
| 167407 | 9/1987 | Japan . |
| 62-221907 | 9/1987 | Japan . |
| 63-305014 | 12/1988 | Japan . |
| 1-202177 | 8/1989 | Japan . |
| 2068308 | 8/1981 | United Kingdom . |
| 2186947 | 9/1987 | United Kingdom . |

Primary Examiner—Parshotam S. Lall  
Assistant Examiner—Thomas S. Auchterlonie  
Attorney, Agent, or Firm—Cushman, Darby & Cushman

[57] ABSTRACT

The expanding/contracting accelerations of shock absorbers on a motor vehicle are detected and compared with preset accelerations, respectively, by an electronic controller, which individually varies the damping forces of the shock absorbers as a result of the comparison. The electronic controller corrects the preset accelerations so that the damping forces of the shock absorbers will be switched over at a uniform frequency or the damping forces of the front left and rear left shock absorbers and the damping forces of the front right and rear right shock absorbers will be switched over at a constant frequency.

5 Claims, 19 Drawing Sheets

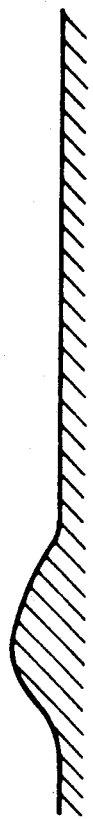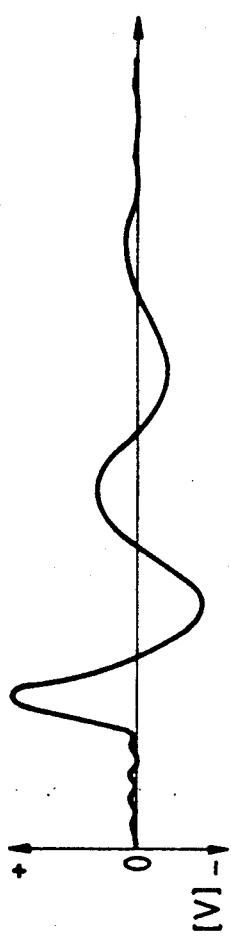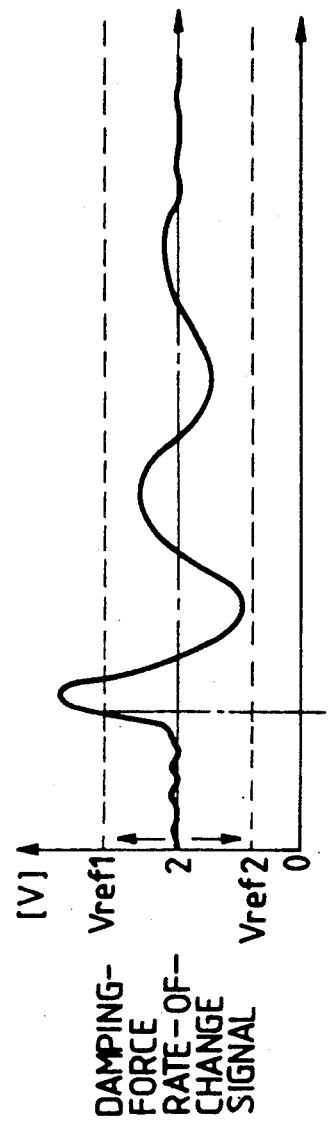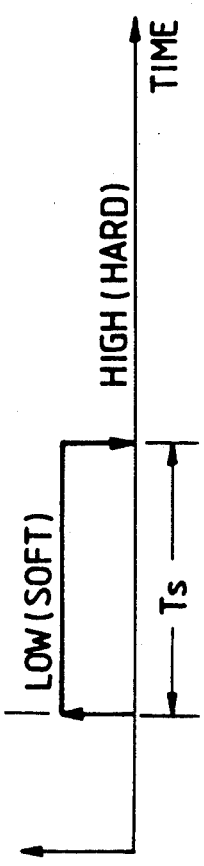
FIG. 7 (A) ROAD SURFACE
FIG. 7 (B) VOLTAGE AT(a) IN FIG. 6
FIG. 7 (C) DAMPING-FORCE RATE-OF-CHANGE SIGNAL
FIG. 7 (D) DAMPING FORCE

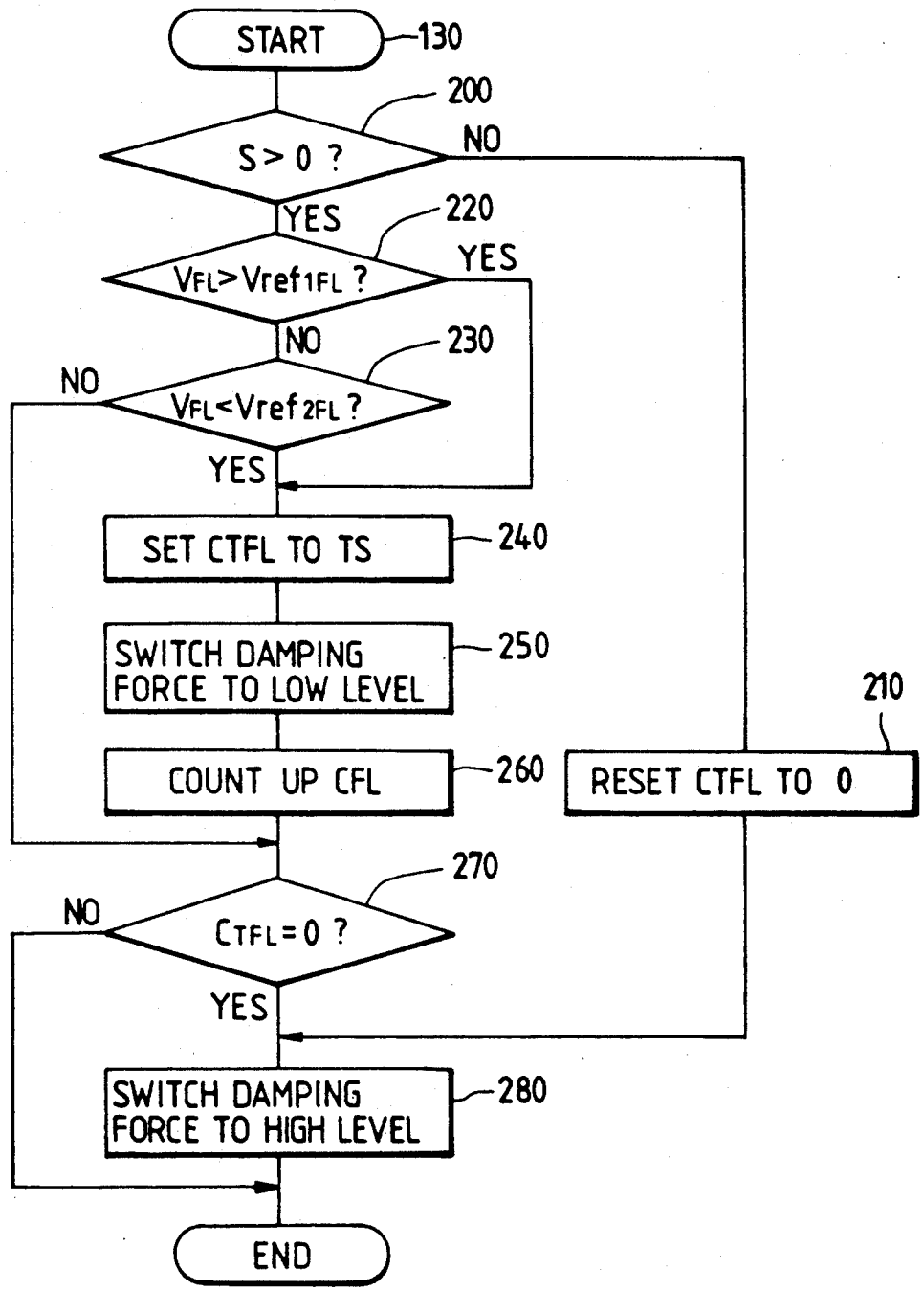

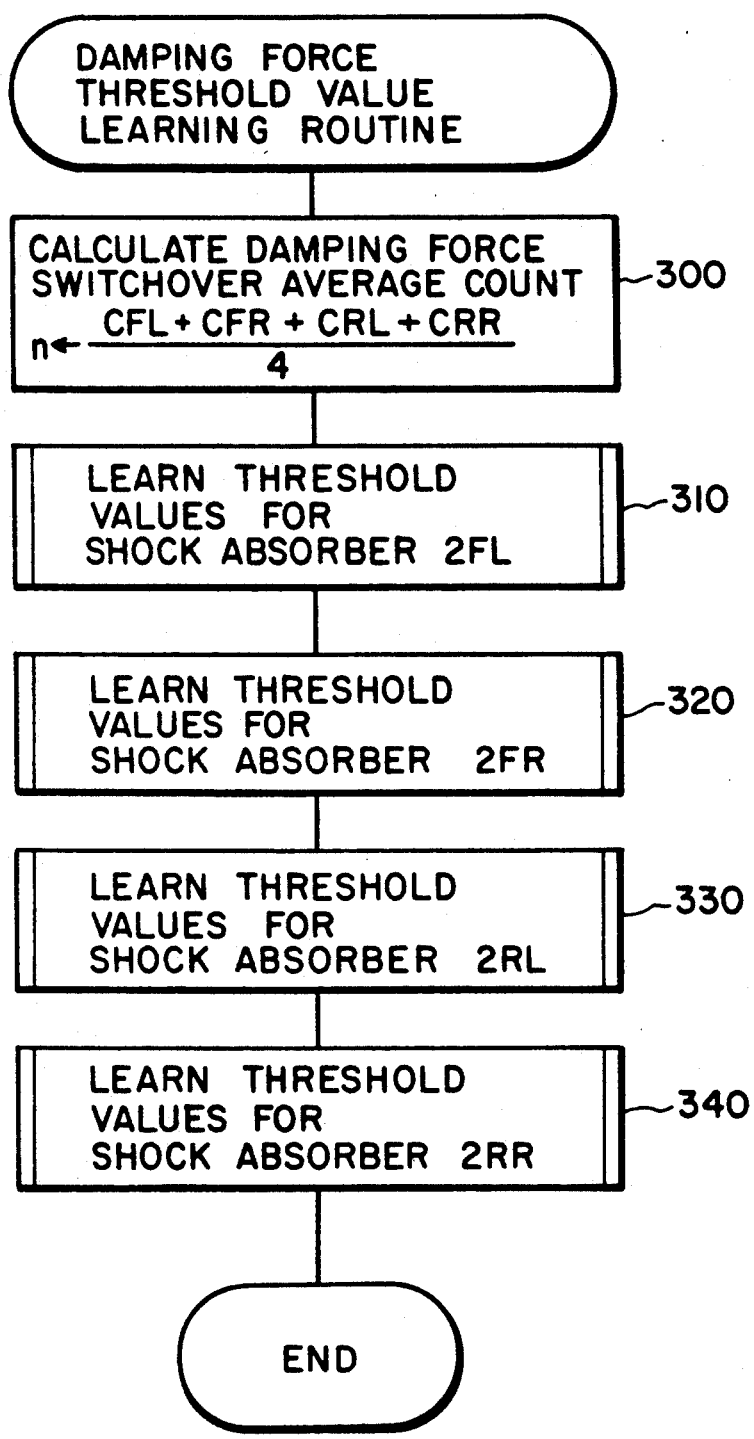

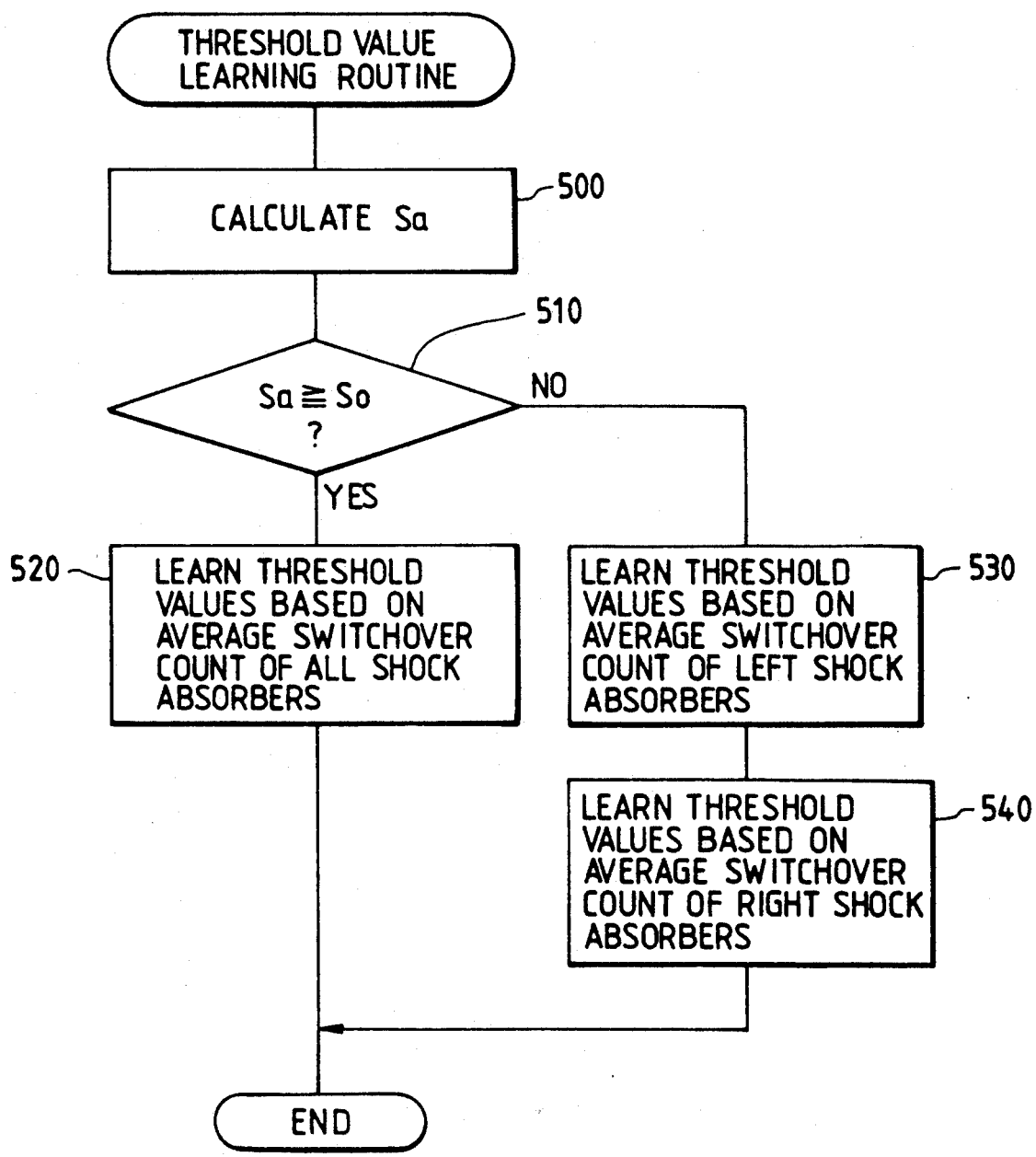

A SYSTEM FOR CONTROLLING DAMPING FORCE OF SHOCK ABSORBERS BY ADAPTIVELY ADJUSTING THE DESIRED ACCELERATION EXPANSION/CONTRACTION OF THE SHOCK ABSORBERS

BACKGROUND OF THE INVENTION

This application is generally related to a number of other applications which each define suspension control systems. Each of these related applications has been given an application number as listed below:

| NAME | APPLN. # | FILING DATE | ATTN-DOCKET # |
| --- | --- | --- | --- |
| Tsutsumi | 07/520,185 | May 8, 1990 | 78879CDCTY00 |
| Tsutsumi | 07/580,387 | Sept 11, 1990 | 81282CDCTY |
| Tsutsumi | 07/580,388 | Sept 11, 1990 | 81283CDCTY |
| Tsutsumi | 07/622,534 | Dec 5, 1990 | 82667CDCTY |

1. Field of the Invention

The present invention relates to a damping force control system for controlling the damping forces of shock absorbers depending on the acceleration of expansion of the shock absorbers.

2. Prior Art

One proposed damping force control system for controlling the damping forces of shock absorbers mounted on a motor vehicle is disclosed in Japanese Laid-Open Patent Publication No. 62-221907 published Sep. 30, 1987. The disclosed damping force control system detects road conditions based on the acceleration of expansion/contraction the shock absorbers, and varies the damping forces of the shock absorbers depending on the detected road conditions for thereby reducing vertical vibration of the motor vehicle.

Various devices have been employed to detect the acceleration of expansion/contraction a shock absorber. According to one arrangement, an expansion/contraction acceleration is detected based on a change in an output signal from a stroke sensor which detects the stroke of the piston in the shock absorber, as disclosed in the above publication. According to another proposal, a piezoelectric load sensor which comprises a laminated piezoelectric assembly is disposed between a shock absorber housing and a piston rod, and an expansion/contraction acceleration is detected based on a change in an electric charge generated by the piezoelectric load sensor.

The damping force control system includes a plurality of such expanding/contracting acceleration sensors attached respectively to the shock absorbers that are incorporated in suspensions by which road wheels are supported. The damping forces of the shock absorbers are independently controlled based on the signals detected by the respective sensors. If the detecting sensitivities of the sensors are different from each other, however, the damping forces of the shock absorbers tend to vary or switch over at different frequencies, resulting in poor riding comfort.

More specifically, the damping force of a shock absorber is varied as follows: The expansion/contraction acceleration of the shock absorber is detected by a stroke sensor or piezoelectric load sensor of the type described above. If the detected acceleration is greater than a preset threshold level, then the control system determines that the road surface has large irregularities, and reduces the damping force of the shock absorber. Therefore, if the sensors associated with the respective shock absorbers have sensitivity variations, then the damping forces of the shock absorbers are varied at different frequencies, and the motor vehicle gives passengers poor riding comfort.

To solve the above problem, it is necessary to employ expansion/contraction sensors having uniform sensitivity or output characteristics. However, it is practically difficult to make uniform the output characteristics of various sensors uniform. Even if the sensors are initially adjusted to uniform their output characteristics, their output characteristics will vary with time during usage.

SUMMARY OF THE INVENTION

It is an object of the present invention to provide a damping force control system for controlling shock absorbers on a motor vehicle so that their damping forces will be varied or switched over at a uniform frequency so as not to impair the riding comfort on the motor vehicle, even if sensors used for detecting the expansion/contraction acceleration of the shock absorbers have different sensitivity or output characteristics.

According to the present invention, there is provided a damping force control system in a motor vehicle having a motor vehicle body and road wheels rotatably supported on the motor vehicle body, the damping force control system has front left, rear left, front right, and rear right shock absorbers coupled between a motor vehicle body and the respective road wheels and damping forces variable selectively into at least two levels, detecting means for detecting the expansion/contraction accelerations of at least the front left and front right shock absorbers, control means for comparing the detected expanding/contracting accelerations with preset accelerations, respectively, and for individually switching over the damping forces of the shock absorbers as a result of the comparison the present invention also has, comparing means for calculating the frequencies of switching over of the damping forces of the shock absorbers, the expansion/contraction accelerations of which are detected, in a predetermined period of time, and for comparing the calculated frequencies with a reference frequency. A and correcting means corrects the preset accelerations as a result of the comparison, by the comparing means, so that the damping forces of the shock absorbers will be switched over at a uniform frequency by the control means or the damping forces of the front left and rear left shock absorbers and the damping forces of the front right and rear right shock absorbers will be switched over at a constant frequency by the control means.

According to the present invention, there is also provided a damping force control system in a motor vehicle having a motor vehicle body and front and rear road wheels rotatably supported on the motor vehicle body. The damping force control system has shock absorbers coupled between a motor vehicle body and the respective front and rear road wheels and damping forces variable selectively into at least two levels, detecting means for detecting the expanding/contracting accelerations of the shock absorbers, control means for comparing the detected expansion/contraction accelerations with preset accelerations, respectively, and for individually switching over the damping forces of the shock absorbers as a result of the comparison. A switchover comparing means compares a switchover condition of the damping forces of the shock absorbers associated with the front road wheels with a switchover condition of the damping forces of the shock absorbers associated with the rear road wheels while the motor vehicle is running straight ahead. In edition, a correcting means corrects the preset accelerations as a result of the comparison, by the switchover comparing means, so that the damping forces of the shock absorbers associated with the front and rear road wheels will be switched over to one of the two levels by the control means while the motor vehicle is running straight ahead.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 7(A) through 7(D) are diagrams showing operation of the circuit for detecting the rate of change of damping forces and a control process for varying damping forces;

FIGS. 9A and 9B are a flowchart of a damping force varying process;

FIGS. 10A and 10B are a flowchart of a threshold level learning process;

FIGS. 12 and 13 are flowcharts of still other threshold level learning processes;

DETAILED DESCRIPTION

Figure 1:
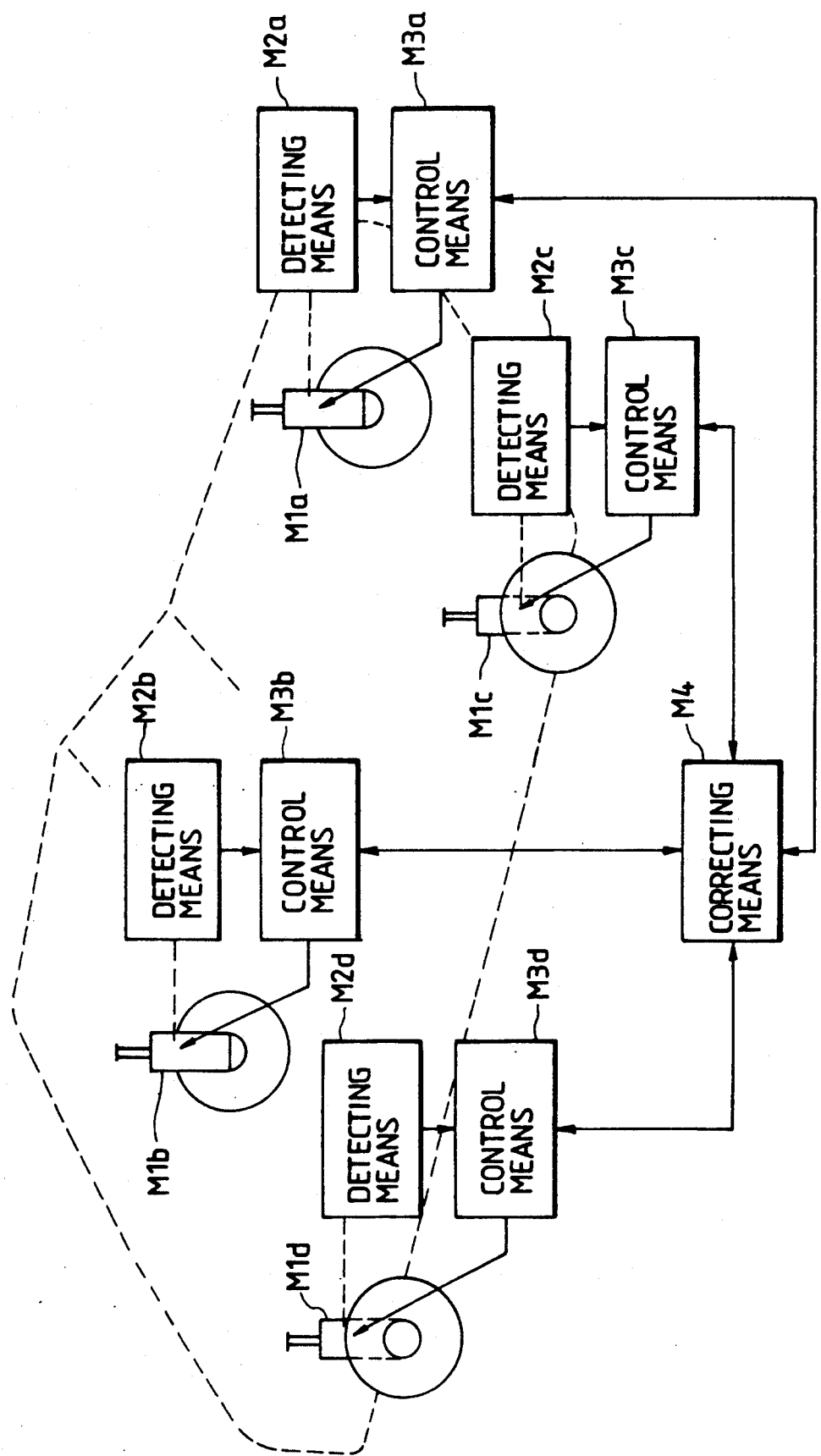
FIG. 1 is a block diagram of a damping force control system according to the present invention.

As shown in FIG. 1, a damping force control system according to the present invention comprises front left, rear left, front right, and rear right shock absorbers M1a, M1b, M1c, M1d coupled between a motor vehicle body and respective road wheels and having damping forces selectively switchable into at least two levels, detecting means M2a, M2b, M2c, M2d for detecting the expansion/contraction accelerations $\alpha a$, $\alpha b$, $\alpha c$, $\alpha d$ of the shock absorbers M1a, M1b, M1c, M1d, respectively, control means M3a, M3b, M3c, M3d for comparing the detected expansion/contraction accelerations $\alpha a$, $\alpha b$, $\alpha c$, $\alpha d$, respectively, with preset accelerations $\alpha o$ and for individually switching over the damping forces of the shock absorbers as a result of the comparison. A correcting means M4 corrects the preset accelerations so that the damping forces of the shock absorbers M1a, M1b, M1c, M1d will be switched over at a uniform frequency by the control means M3a, M3b, M3c, M3d or the damping forces of the front left and rear left shock absorbers M1a, M1b and the damping forces of the front right and rear right shock absorbers M1c, M1d will be switched over at a uniform frequency by the control means M3a, M3b and the control means M3c, M3d, respectively.

In operation, the expansion/contraction accelerations $\alpha a$, $\alpha b$, $\alpha c$, $\alpha d$ of the shock absorbers M1a, M1b, M1c, M1d are detected by the respective detecting means M2a, M2b, M2c, M2d, and compared with the preset accelerations $\alpha o$ by the control means M3a, M3b, M3c, M3d, respectively, which individually vary the damping forces of the shock absorbers M1a, M1b, M1c, M1d as a result of the comparison. The correcting means M4 corrects the preset accelerations $\alpha o$ so that the damping forces of the shock absorbers M1a, M1b, M1c, M1d will be switched over at a uniform frequency by the control means M3a, M3b, M3c, M3d or the damping forces of the front left and rear left shock absorbers M1a, M1b and the damping forces of the front right and rear right shock absorbers M1c, M1d will be switched over at a uniform frequency by the control means M3a, M3b and the control means M3c, M3d, respectively.

Therefore, even if the detecting means M2a, M2b, M2c, M2d have different sensitivities or output characteristics for detecting the respective expansion/contracting accelerations $\alpha a$, $\alpha b$, $\alpha c$, $\alpha d$, the damping forces of the shock absorbers M1a, M1b, M1c, M1d can be varied at a uniform frequency, or the damping forces of the front left and rear left shock absorbers M1a, M1b and the damping forces of the front right and rear right shock absorbers M1c, M1d can be varied at a uniform frequency. As a consequence, the riding comfort of the motor vehicle is improved.

Figure 2:
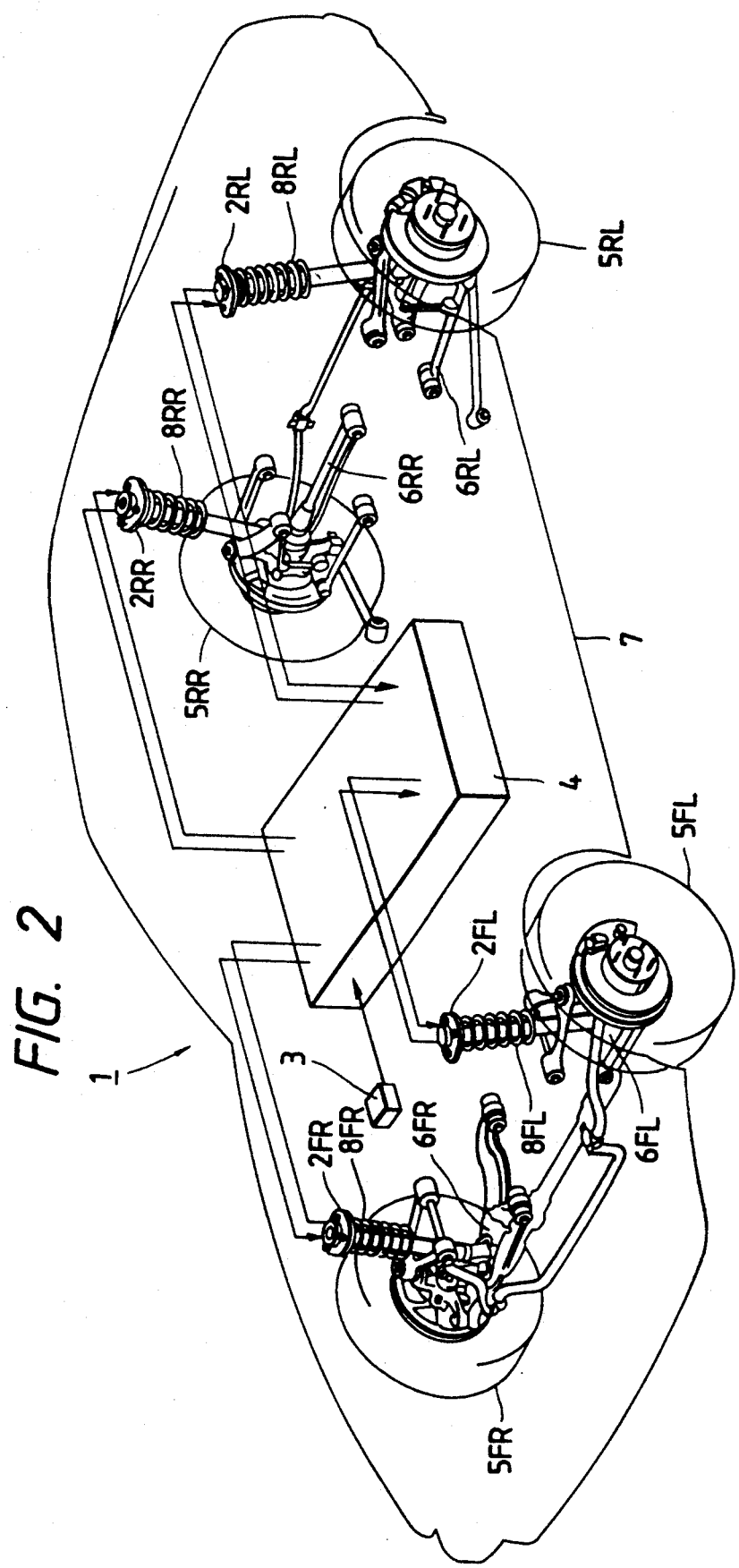
FIG. 2 is a perspective view of the damping force control system.

More specifically, as shown in FIG. 2, a shock absorber damping force control system, generally designated by the reference numeral 1, incorporated in a motor vehicle includes a front left shock absorbers 2FL, a front right shock absorbers 2FR, a rear left shock absorber 2RL, a rear right shock absorber 2RR, a vehicle speed sensor 3 for detecting the speed of travel of the motor vehicle, and an electronic controller 4 for controlling the shock absorbers 2FL, 2FR, 2RL, 2RR. The shock absorbers 2FL, 2FR, 2RL, 2RR are constructed such that their damping forces are variable.

As described later on, the shock absorbers 2FL, 2FR, 2RL, 2RR have respective piezoelectric load sensors for detecting the damping forces produced thereby, and respective piezoelectric actuators for varying or switching over the damping forces of the shock absorbers 2FL, 2FR, 2RL, 2RR.

The shock absorbers 2FL, 2FR, 2RL, 2RR and coil springs 8FL, 8FR, 8RL, 8RR disposed therearound are coupled between a vehicle body 7 and suspension lower arms 6FL, 6FR, 6RL, 6RR, respectively, connected to front left, front right, rear left, and rear right road wheels 5FL, 5FR, 5RL, 5RR, respectively.

A detected signal from the vehicle speed sensor 3 is applied to the electronic controller 4, which then supplies control signals to the piezoelectric actuators of the shock absorbers 2FL, 2FR, 2RL, 2RR.

The construction of the shock absorbers 2FL, 2FR, 2RL, 2RR will be described below. Since the shock absorbers 2FL, 2FR, 2RL, 2RR are structurally identical to each other, only one of them, the shock absorber 2FL associated with the front left road wheel 5FL, for example, will be described below.

Figure 3A:
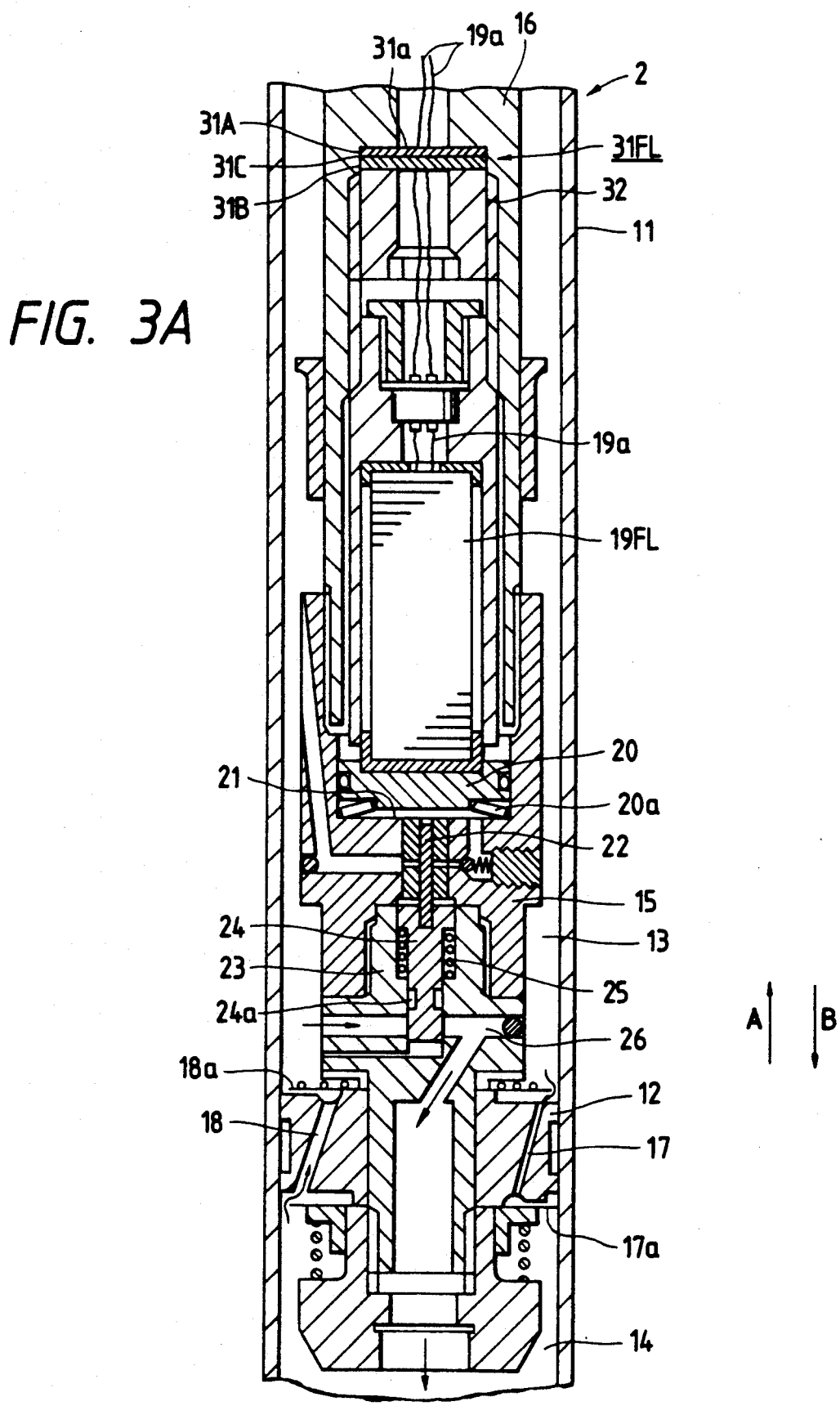
FIG. 3A is a fragmentary cross-sectional view of a variable-damping-force shock absorber.

As shown in FIG. 3A, the shock absorber 2FL comprises a cylinder 11 and a main piston 12 slidably fitted therein for movement in axial directions indicated by the arrows A, B. The interior space of the cylinder 11 is divided into first and second hydraulic pressure chambers 13, 14 by the main piston 12. The main piston 12 is coupled to one end of a piston rod 15, the other end of which is connected to a shaft 16. The cylinder 11 has a lower end (not shown) connected to the lower arm 6RL which supports the front left road wheel 5FL. The shaft 16 has an upper end (not shown) coupled to the motor vehicle body 7.

The main piston 12 has an expansion-side fixed orifice 17 and a contraction-side fixed orifice 18 through both of which the first and second hydraulic pressure chambers 13, 14 are held in fluid communication with each other. Plate valves 17a, 18a are mounted respectively on the opposite ends of the main piston 12 over the outlet ends of the fixed orifices 17, 18. The plate valves 17a, 18a serve to allow working oil to flow through the fixed orifices 17, 18 in only one direction therethrough.

When the main piston 12 slides in the cylinder 11 in the axial directions indicated by the arrows A, B, working oil flows through the fixed orifices 17, 18 between the first and second hydraulic pressure chambers 13, 14. The damping force of the shock absorber 2FL is determined by the cross-sectional area of a passage (including the fixed orifices 17, 18) through which the working oil flows across the main piston 12 between the first and second hydraulic pressure chambers 13, 14.

The piston rod 15 has an axial hollow space defined therein that houses a piezoelectric actuator 19FL in the form of a laminated piezoelectric element made of a piezoelectric ceramic material such as PZT or the like. A piston 20 is disposed in closely confronting relation to the lower end of the piezoelectric actuator 19FL. The piston 20 is axially slidable in the hollow space in the piston rod 15, and is normally urged to move in the direction indicated by the arrow A by means of a leaf spring 20a acting on the lower end of the piston 20.

When a voltage which is as high as several hundred volts is applied to the piezoelectric actuator 19FL to expand the actuator 19FL, the piston 20 is moved several tens of μm in the direction indicated by the arrow B. When the electric charges which have been stored in the piezoelectric actuator 19FL by the application of a voltage thereto are discharged, the piston 20 springs back in the direction indicated by the arrow A under the bias of the leaf spring 20a. The piezoelectric actuator 19FL is charged and discharged through leads 19a extending through a passage that is defined axially in the shaft 16.

The surface which defines the interior space of the piston rod 15 and the lower surface of the piston 20 jointly define a sealed oil chamber 21. A cylindrical plunger 22 is slidably fitted in a through hole which is defined axially in the piston rod 15 and communicating with the bottom of the sealed oil chamber 21. The plunger 22 has a lower end joined to the upper end of a spool valve 24 slidably fitted in a hole defined axially in a housing 23 fixed to the piston rod 15. The main piston 12 is mounted on the housing 23.

The spool valve 24 is normally urged to move in the direction indicated by the arrow A by means of a spring 25 disposed around the spool valve 24 in the housing 23. The spool valve 24 has an annular groove 24a defined in a lower outer peripheral surface thereof. The lowermost portion of the spool valve 24 is of a cylindrical shape.

The housing 23 fixed to the piston rod 15 has an auxiliary passageway 26 which provides fluid communication between the first and second hydraulic pressure chambers 13, 14. The auxiliary passageway 26 is normally closed by the lowermost portion of the spool valve 24 which is biased in the direction indicated by the arrow A by the spring 25.

When a piezoelectric actuator 19FL is expanded to move the piston 20 in the direction indicated by the arrow B by applying a voltage of several hundred volts to the piezo-electric actuator 19FL, the pressure in the sealed oil chamber 21 builds up to move the plunger 22 and the spool valve 24 also in the direction indicated by the arrow B until the auxiliary passageway 26 is opened by the annular groove 24a of the spool valve 24. Therefore, the first and second hydraulic pressure chambers 13, 14 are brought into communication with each other through the auxiliary passageway 26. The cross-sectional area of the working oil passage through the main passage 12 is thus increased, and hence the rate of flow of the working oil between the first and second hydraulic pressure chambers 13, 14 is increased. The damping force of the shock absorber 2FL is now reduced below a normal level.

Figure 4:
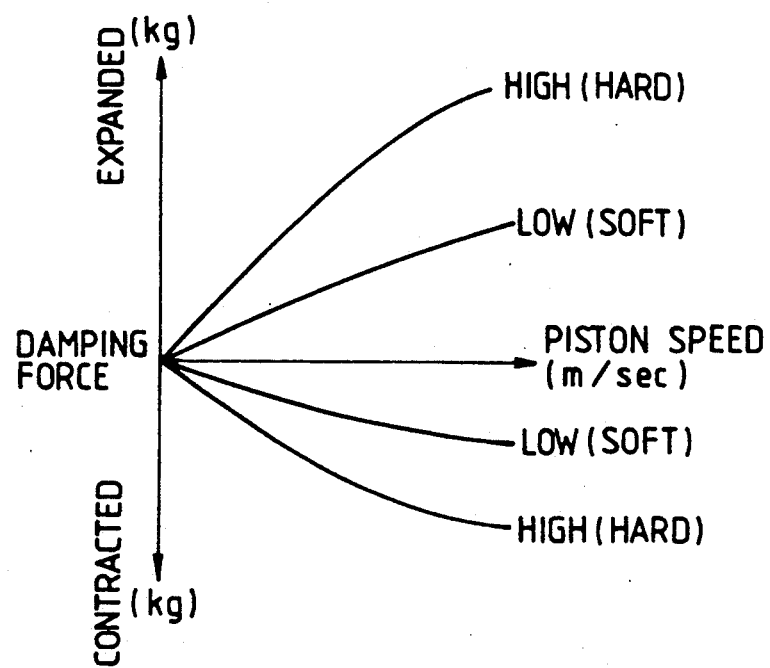
FIG. 4 is a diagram showing damping force characteristic curves of the shock absorbers.

Therefore, application of the voltage to the piezoelectric actuators 19FL, 19FR, 19RL, 19RR in the shock absorbers 2FL, 2FR, 2RL, 2RR expands the piezoelectric actuators 19FL, 19FR, 19RL, 19RR, whereupon the damping forces change to a low level (soft) as shown in FIG. 4. Normally, the damping forces are maintained at a high level (hard) as shown in FIG. 4.

Figure 3B:
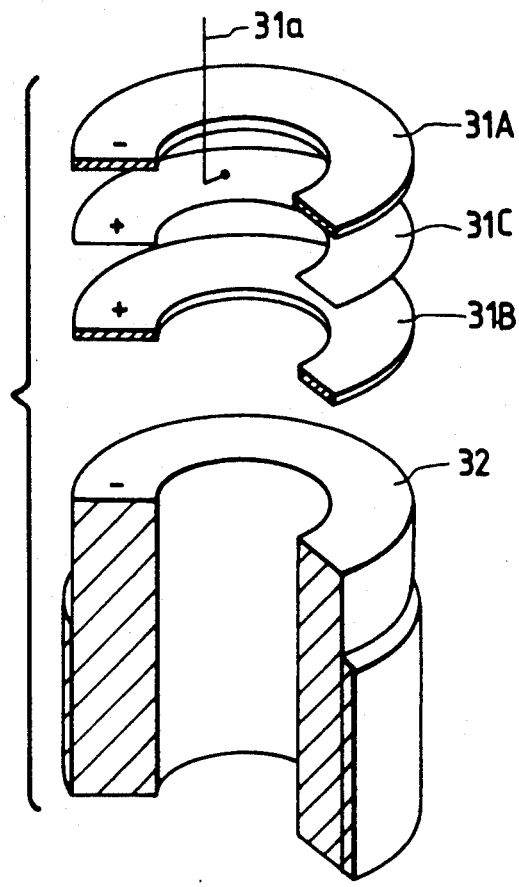
FIG. 3B is an enlarged perspective view, partly cut away, of a piezoelectric load sensor in the shock absorber.

A piezoelectric load sensor 31FL for detecting the magnitude of the damping force produced by the shock absorber 2FL is fixedly mounted in an upper portion of the shaft 16 by means of a nut 32. As also shown in FIG. 3B, the piezoelectric load sensor 31FL comprises two thin piezo-electric plates 31A, 31B made of a ceramic material such as PZT or the like, and an electrode 31C sandwiched between the piezoelectric plates 31A, 31B. A detected signal from the piezoelectric load sensor 31FL is fed to the electronic controller 4 over a lead 31a extending through the passage in the shaft 16.

Figure 5:
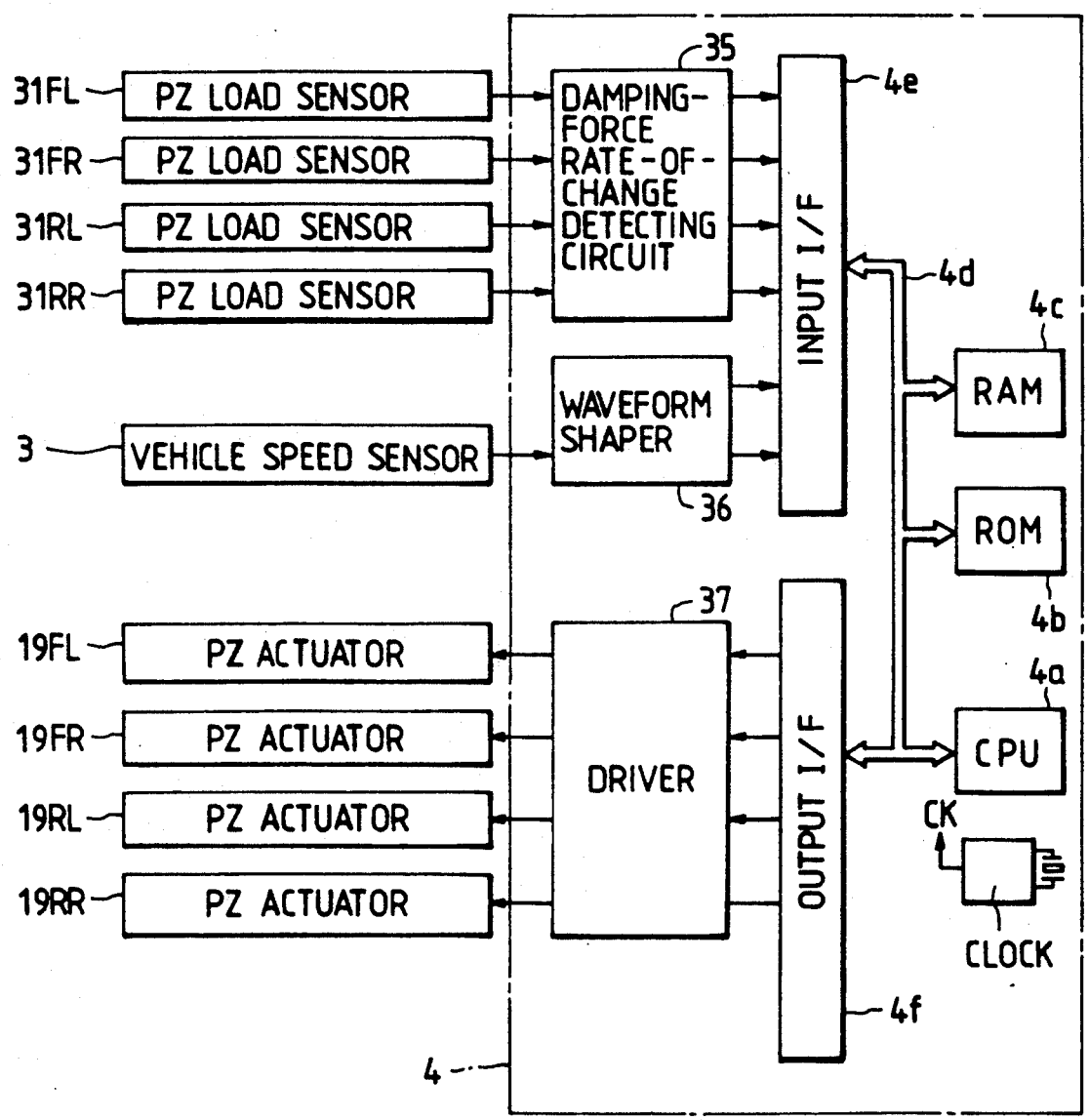
FIG. 5 is a block diagram of an electronic controller of the damping force control system.

As illustrated in FIG. 5, the electronic controller 4 is in the form of a logic arithmetic unit including a central processing unit (CPU) 4a, a read-only memory (ROM) 4b, and a random access memory (RAM) 4c. The CPU 4a, the ROM 4b, and the RAM 4c are connected to input and output interfaces 4e, 4f through a common bus 4d for receiving and transmitting signals.

Detected signals from the piezoelectric load sensors 31FL, 31FR, 31RL, 31RR are applied to the CPU 4a through a circuit 35 for detecting the rate of change of damping forces and also through the input interface 4e. A detected signal from the vehicle speed sensor 3 is applied to the CPU 4a through a waveform shaper 36 and the input interface 4e.

The CPU 4a transmits control signals to the piezoelectric actuators 19FL, 19FR, 19RL, 19RR through the output interface 4f and a driver 37.

Figure 6:
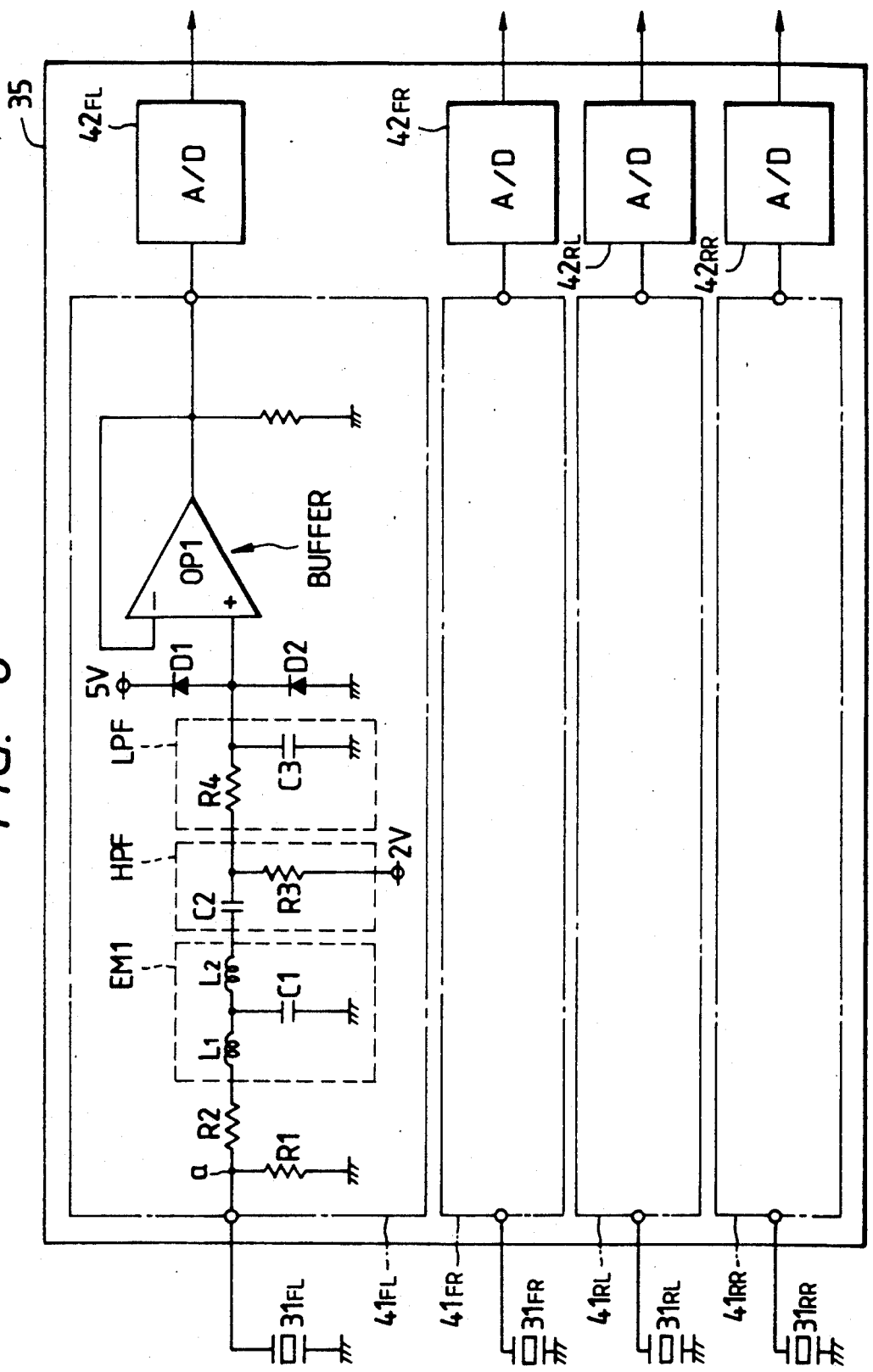
FIG. 6 is a circuit diagram, partly in block form, of a circuit for detecting the rate of change of damping forces.

The damping-force rate-of-change detecting circuit 35 corresponds to the detecting means M2a, M2b, M2c, M2b (describe above) which detect expansion/contraction accelerations of the shock absorbers 2FL, 2FR, 2RL, 2RR based on the detected signals from the piezoelectric load sensors 31FL, 31FR, 31RL, 31RR. As shown in FIG. 6, the dampingforce rate-of-change detecting circuit 35 comprises four detectors 41FL, 41FR, 41RL, 41RR coupled respectively to the piezoelectric load sensors 31FL, 31FR, 31RL, 31RR, and four analog-to-digital (A/D) converters 42FL, 42FR, 42RL, 42RR for converting analog output signals from the detectors 41FL, 41FR, 41RL, 41RR to corresponding digital signals.

Operation of the detectors 41FL, 41FR, 41RL, 41RR will be described below. Since these detectors are identical in structure to each other, only the detector 41FL will be described in detail.

As illustrated in FIG. 6, the detector 41FL has a resistor R1 connected parallel to the piezoelectric load sensor 31FL. When the shock absorber 2FL is expanded or contracted, electric charges depending on the damping force generated thereby are generated across the piezoelectric load sensor 31FL and flow through the resistor R1. Therefore, an electric current flows through the resistor R1 each time the damping force of the shock absorber 2FL varies. The value of the current represents the rate of change of the damping force of the shock absorber 2FL. The detector 41FL detects the current flowing through the resistor R1 based on a voltage produced across the resistor R1, and supplies the A/D converter 42FL with the detected current as a detected signal indicative of the rate of change of the damping force produced by the shock absorber 2FL.

More specifically, the voltage produced across the resistor R1 is applied through a resistor R2 to a noise filter EMI comprising two coils L1, L2 and a capacitor C1, by which any high-frequency signal components such as electromagnetic wave noise are removed from the voltage. The voltage signal from which the noise has been removed is then applied to a high-pass filter HPF which comprises a coupling capacitor C2 and a resistor R3 to which an offset voltage of 2 volts is applied. The high-pass filter HPF removes lowfrequency signal components having frequencies below 0.1 Hz from the voltage signal, and also increases the voltage of the voltage signal by 2 V. The voltage signal is thereafter applied to a low-pass filter LPF comprising a resistor R4 and a capacitor C3, by which high-frequency signal components having frequencies higher than 100 Hz are removed from the voltage signal. Then, the voltage signal is applied through a buffer in the form of an operational amplifier OP1 to the A/D converter 42FL.

If the front left road wheel 5FL runs over a bump on the road as shown in FIG. 7A and the shock absorber 2FL is contracted and expanded, the voltage across the resistor R1 (i.e., the voltage at a point a in FIG. 6) varies as indicated in FIG. 7B. A voltage signal having a frequency range from 0.1 to 100 Hz, with 2 volts added, as shown in FIG. 7C, is produced as a signal indicating the rate of change of the damping force from the detector 41FL as shown in FIG. 7D.

The voltage signal having the frequency range from 0.1 to 100 Hz is extracted from the voltage across the resistor R1 by the high-pass filter HPF and the low-pass filter LPF because the shock absorber 2FL expands and contracts in this frequency range.

The detector 41FL has a pair of protective diodes D1, D2 for protecting the operational amplifier OP1 by applying an input voltage ranging from 0 to 5 V to the operational amplifier OP1.

Figure 8:
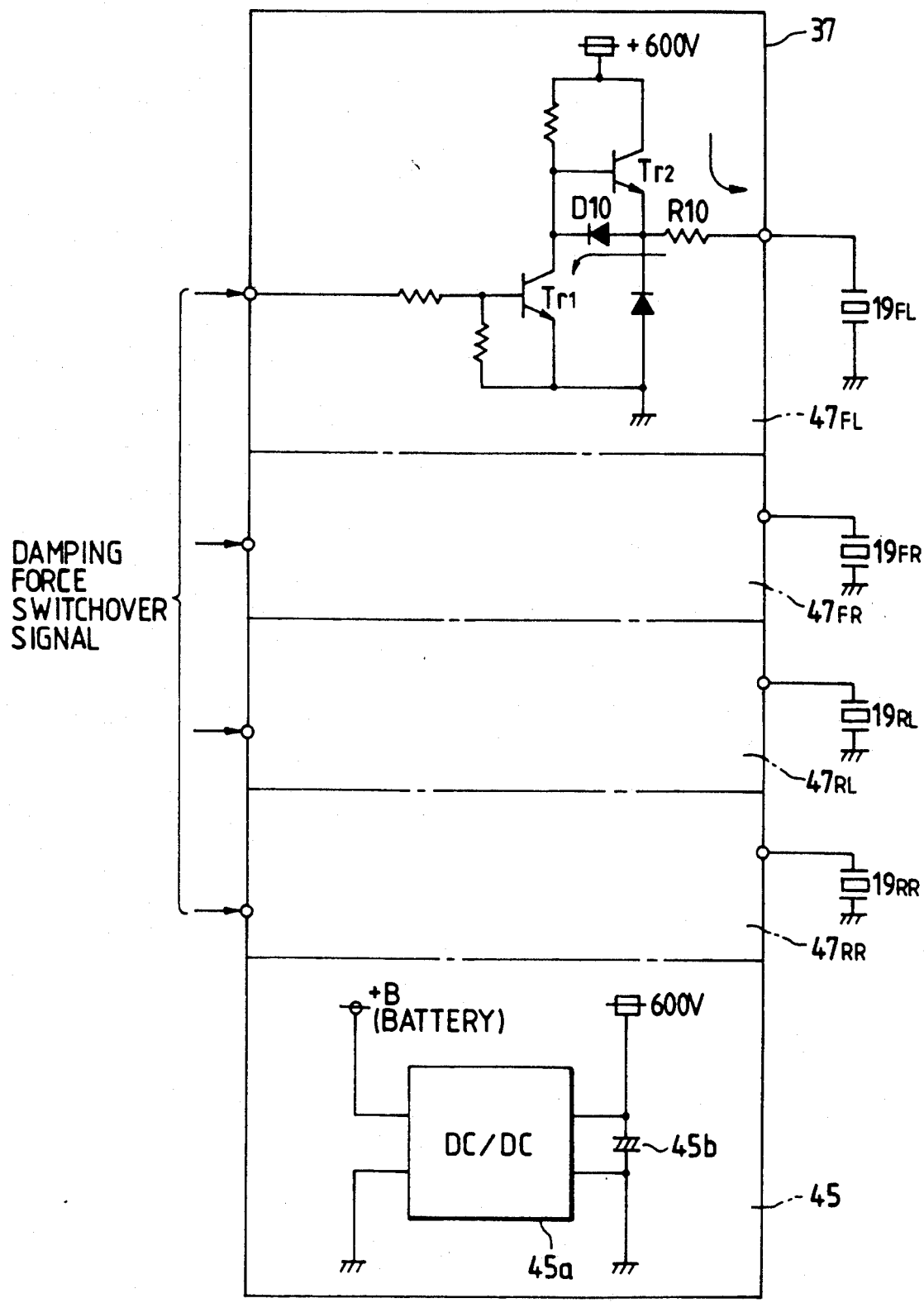
FIG. 8 is a circuit diagram of a driver circuit.

The driver 37 is responsive to control signals, i.e., damping force switchover signals, applied from the CPU 4a through the output interface 4f for energizing the piezo-electric actuators 19FL, 19FR, 19RL, 19RR in the respective shock absorbers 2FL, 2FR, 2RL, 2RR. As shown in FIG. 8, the driver 37 comprises a high-voltage generator 45 for generating a high voltage, and charging/discharging circuits 47FL, 47FR, 47RL, 47RR for applying the high voltage from the high-voltage generator 45 to the piezoelectric actuators 19FL, 19FR, 19RL, 19RR or discharging the piezoelectric actuators 19FL, 19FR, 19RL, 19RR in response to the damping force switchover signals from the CPU 4a.

The high voltage generator 45 has a DC/DC converter 45a for converting the voltage of a battery on the motor vehicle to a voltage of 600 volts, and a capacitor 45b for storing the converted high voltage.

The charging/discharging circuits 47FL, 47FR, 47RL, 47RR are arranged such that they apply the high voltage to the piezoelectric actuators 19FL, 19FR, 19RL, 19RR when the damping force switchover signal at a low level is applied, and they discharge the charged high voltage from the piezoelectric actuators 19FL, 19FR, 19RL, 19RR when the damping force switchover signal at a high level is applied.

The charging/discharging circuits 47FL, 47FR, 47RL, 7RR are structurally identical to each other. Thus, only the charging/discharging circuit 47FL, for example, will be described in greater detail. Upon application of a low-level damping force switchover signal, a transistor Tr1 is turned off and a transistor Tr2 is turned on. Therefore, the high voltage generator 45 and the piezoelectric actuator 19FL are connected to each other through the transistor Tr 2 and a resistor R10, so that the high voltage is applied to the piezoelectric actuator 19FL. When a high-level damping force switchover signal is applied, the transistor Tr1 is turned on and the transistor Tr2 is turned off. The high voltage generator 45 and the piezoelectric actuator 19FL are disconnected from each other. The piezoelectric actuator 19FL is grounded through the resistor R10, a diode D10, and the transistor Tr1, thereby discharging the charges stored in the piezoelectric actuator 19FL.

Therefore, the damping forces of the shock absorbers 2FL, 2FR, 2RL, 2RR are reduced when the high voltage is applied to the piezoelectric actuators 19FL, 19FR, 19RL, 19RR to expand them, and are increased when the charges stored in the piezoelectric actuators 19FL, 19FR, 19RL, 19RR are discharged to contract them. In order to reduce the damping forces of the shock absorbers 2FL, 2FR, 2RL, 2RR, a low-level damping force switchover signal should be applied to the charging/discharging circuits 47FL, 47FR, 47RL, 47RR. Conversely, in order to increase the damping forces of the shock absorbers 2FL, 2FR, 2RL, 2RR, a high-level damping force switchover signal should be applied to the charging/discharging circuits 47FL, 47FR, 47RL, 47RR.

Figure 9A:
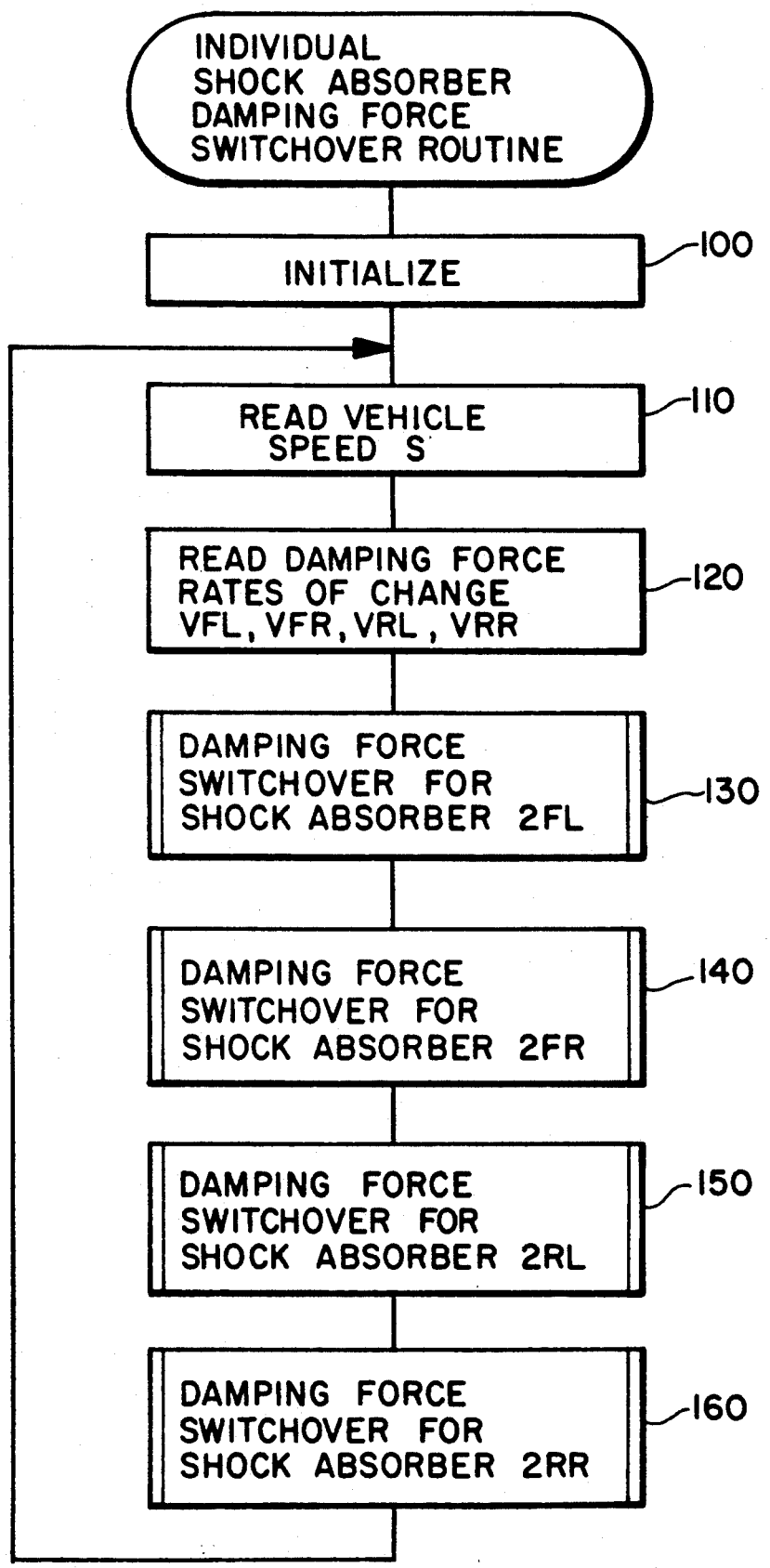

A process of varying or switching over the damping forces of the shock absorbers 2FL, 2FR, 2RL, 2RR is carried out by the CPU 4a as follows:

FIGS. 9A and 9B show a damping force varying routine to be executed repeatedly by the CPU 4a in order to vary the damping forces of the shock absorbers 2FL, 2FR, 2RL, 2RR.

As shown in FIG. 9A, counters used in the subsequent process and a threshold value for detecting bumpy road surfaces are initialized in a step 100. Then, a vehicle speed S detected by the vehicle speed sensor 3 is read in a step 110, and signals VFL, VFR, VRL, VRR indicative of the rates of change of the damping forces of the shock absorbers 2FL, 2FR, 2RL, 2RR are read from the damping-force rate-of-change detecting circuit 35 in a step 120. Thereafter, the damping forces of the shock absorbers 2FL, 2FR, 2RL, 2RR are varied or switched over in respective steps 130, 140, 150, 160, after which control goes back to the step 110 for repeated execution of the entire process.

The damping forces of the shock absorbers 2FL, 2FR, 2RL, 2RR which are to be varied in the steps 130 through 160 are controlled according to the procedure illustrated in FIG. 9B. FIG. 9B shows the control procedure for controlling only the damping force of the shock absorber 2FL associated with the front left road wheel 5FL. The control procedures for the damping forces of the shock absorbers 2FR, 2RL, 2RR are the same as that shown in FIG. 9B and will not be described.

First, a step 200 determines whether the vehicle speed S read in the step 110 is higher than 0, i.e., whether the motor vehicle is running or not. If the motor vehicle is at rest, then control jumps to a step 210 in which a time counter CTFL (described later) is reset to 0, and then control goes to a step 280.

If the motor vehicle is running, then control proceeds to a step 220 which determines whether the damping-force rate-of-change signal VFL read in the step 120 is higher than an upper limit Vref1FL which has been established with respect to the shock absorber 2FL. If VFL≦Vref1FL, then control goes to a step 230 which determines whether the damping-force rate-of-change signal VFL is lower than a lower limit Vref2FL which has also been established with respect to the shock absorber 2FL.

The upper and lower limits Vref1FL, Vref2FL are threshold values used for detecting bumpy road surfaces from the damping-force rate-of-change signal VFL, and correspond to the preset acceleratio, described above.

If VFL>Vref1FL in the step 220 or if VFL<Vref2FL in the step 230, then the CPU 4a determines that the road has a convex or a concave on its surface, and control goes to a step 240 in which the time counter CTFL is set to a time Ts in which to hold a predetermined low (or soft) damping force (hereinafter referred to as a "soft holding time Ts"). Thereafter, a low-level damping force switchover signal is applied to the charging/discharging circuit 47FL to vary or switch over the damping force of the shock absorber 2FL to a low or soft level.

The time counter CTFL which is set to the soft holding time Ts in the step 240 is counted down at predetermined time intervals until the count reaches 0 according to a predetermined time counting process. The time counter CTFL thus counts the soft holding time Ts when it is set to a value corresponding to the soft holding time Ts in the step 240.

After the damping force of the shock absorber 2FL has changed to a low or soft level in the step 250, control goes to a step 260 in which a switchover counter CFL which counts the number of switchovers of the damping force is counted up. Then, control goes to a step 270.

The step 270 determines whether the count of the time counter CTFL is 0 or not. The step 270 is also executed if VFL≧Vref2FL in the step 230. More specifically, the time counter CTFL is set to the soft holding time Ts when the damping force changes to a low level, and then counted down according to the time counting process. Therefore, whether the low-level damping force has continued over a period of time longer than Ts can be determined by detecting whether the count of the time counter CTFL is 0 or not.

If CTFL>0, then the routine of FIG. 9B is brought to an end, and if CTFL=0, then control proceeds to a step 80. In the step 280, a high-level damping force switchover signal is applied to the charging/discharging circuit 47FL to increase the damping force of the shock absorber 2FL to a high (or hard) level, and the piezoelectric actuator 19FL is de-energized. Then, the process is finished.

According the damping force switchover control described above, when the front left road wheel 5FL runs over a bump on the road, and the expansion/contraction acceleration of the shock absorber 2FL is increased, and the damping-force rate-of-change signal VFL detected by the detecting circuit 35 becomes higher than the upper limit Vref1FL or lower than the lower limit Vref2FL, as shown in FIG. 7 at (A), (B), and (C), then it is determined that the road surface is rough, and the motor vehicle body will vibrate to impair the riding comfort. Thereafter, as shown in FIG. 7 at (D), the damping force of the shock absorber 2FL is switched over to a low (soft) level for the predetermined period of time Ts to suppress the vibration of the motor vehicle body.

As described above, vehicle body vibration due to rough terrain i presumed from the rate of change of the damping forces o the shock absorbers. If the sensitivities or output characteristics of the piezoelectric load sensors 31FL, 31FR, 31RL, 31RR and the detectors 41FL, 41FR, 41RL, 41RR are different from each other, then the detected rates of change of the damping forces differ among the shock absorbers 2FL, 2FR, 2RL, 2RR, and the damping forces of the shock absorbers 2FL, 2FR, 2RL, 2RR are varied or switched over at different frequencies.

According to the present invention, even if the damping-force rate-of-change signals VFL, VFR, VRL, and VRR which are indicative of the expanding/contracting accelerations of the shock absorbers 2FL, 2FR, 2RL, and 2RR respectively, from each other due to the different characteristics of the piezoelectric load sensors 31FL, 31FR, 31RL, and 31RR and the detectors 41FL, 41FR, 41RL, and 41RR, the threshold values which are represented by the upper limits Vref1FL, Vref1FR, Vref1RL, and Vref1RR and the lower limits Vref2FL, Vref2FR, Vref2RL, and Vref2RR, and are used for selecting the damping forces of the shock absorbers 2FL, 2FR, 2RL, and 2RR are corrected so that the damping forces of the shock absorbers 2FL, 2FR, 2RL, and 2RR will be varied or switched over at a uniform frequency.

A process of learning the threshold values will be described below with reference to FIGS. 10A and 10B. This learning process is executed by the CPU 4a as a timer interrupt routine at predetermined time intervals (each of 1 to 60 sec., for example).

As shown in FIG. 10A, the average n of counts of the switchover counters CFL, CFR, CRL, CRR which are counted up when the damping forces of the shock absorbers 2FL, 2FR, 2RL, 2RR are switched over in the steps 130 through 160 is calculated in a step 300. Thereafter, the threshold values for the shock absorbers 2FL, 2FR, 2RL, 2RR are corrected based on the average count n and the counts of the switchover counters CFL, CFR, CRL, CRR in respective steps 310 through 340.

Figure 10B:
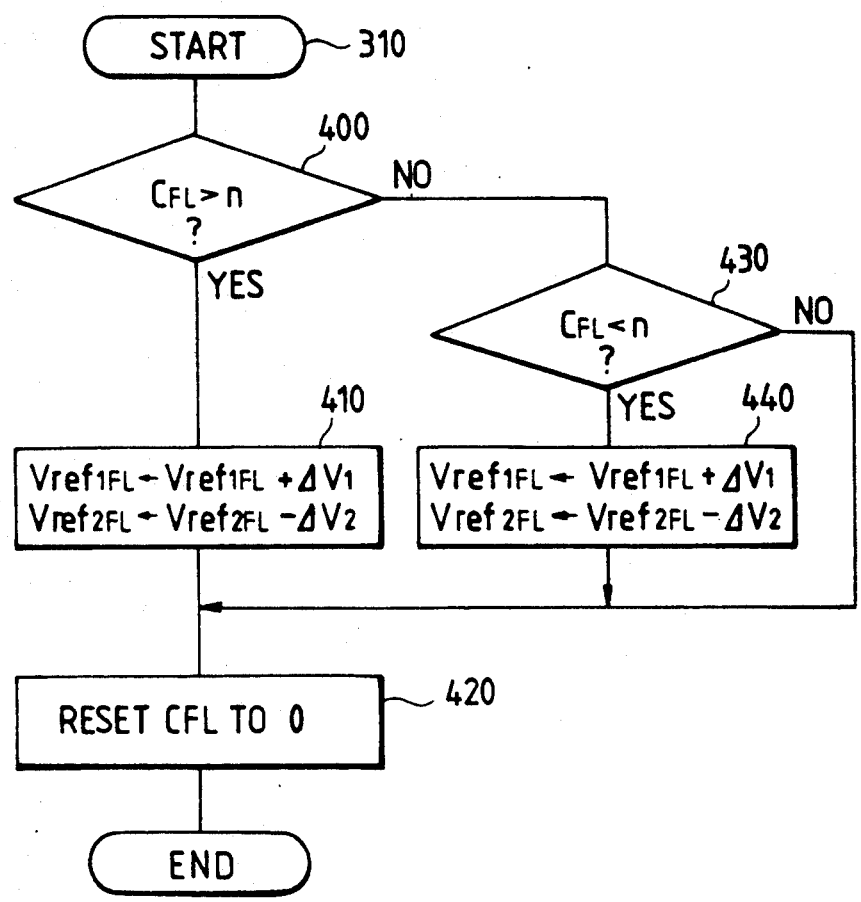

More specifically, the threshold values for the shock absorbers 2FL, 2FR, 2RL, 2RR are learned in the respective steps 310 through 340 as shown in FIG. 10B. FIG. 10B shows the process of learning the threshold values for the shock absorber 2FL associated with the front left road wheel 5FL in the step 310. Inasmuch as the processes of learning the threshold values for the other shock absorbers FR, 2RL, 2RR are the same as the process of FIG. 10B, they will not be described in detail.

According to the learning process shown in FIG. 10B, a step 400 determines whether the count of the switchover counter CFL which represents the number of damping force switchovers with respect to the shock absorber 2FL exceeds the average count n or not, thereby determining whether the frequency at which the damping force of the shock absorber 2FL is switched over is higher than the average frequency at which the damping forces of the shock absorbers 2FL, 2FR, 2RL, 2RR are switched over.

If CFL>n, and hence the frequency at which the damping force of the shock absorber 2FL is higher than the average frequency at which the damping forces of the shock absorbers 2FL, 2FR, 2RL, 2RR are switched over, then control proceeds to a step 410 in which a preset corrective value $\Delta V1$ is added to the upper limit Vref1FL and a preset corrective value $\Delta V2$ is subtracted from the lower limit Vref2FL, thus correcting these threshold values. By thus correcting the threshold values Vref1FL, Vref2FL, the sensitivity with which bumpy road conditions are detected is lowered, thus lowering the frequency at which the damping force of the shock absorber 2FL, is switched over.

If CFL≦n in the step 400, then control goes to a step 430 which determines whether the count of the switchover counter CFL is smaller than the average count n or not, thereby determining whether the frequency at which the damping force of the shock absorber 2FL is lower than the average frequency at which the damping forces of the shock absorbers 2FL, 2FR, 2RL, 2RR are switched over.

If CFL<n, and hence the frequency at which the damping force of the shock absorber 2FL is lower than the average frequency at which the damping forces of the shock absorbers 2FL, 2FR, 2RL, 2RR are switched over, then control proceeds to a step 440 in which the preset corrective value $\Delta V1$ is subtracted from the upper limit Vref1FL and the preset corrective value $\Delta V2$ is added to the lower limit Vref2FL, thus correcting these threshold values. By thus correcting the threshold values Vref1FL, Vref2FL, the sensitivity with which bumpy road conditions are detected is increased, thus increasing the frequency at which the damping force of the shock absorber 2FL is switched over.

If CFL is not smaller than n in the step 430, i.e., if CFL=n, then control goes to a step 420, which is also executed after the step 410 or 440. In the step 420, the switchover counter CFL reset to 0. Thereafter, the process of learning the threshold values for the shock absorber 2FL is finished.

According to the threshold value learning process, as described above, when the frequency at which the damping force of each of the shock absorbers 2FL, 2FR, 2RL, 2RR is switched over in a certain period of time is higher than the average frequency at which the damping forces of the shock absorbers 2FL, 2FR, 2RL, 2RR are switched over, the threshold values are corrected so as to lower the sensitivity with which bumpy road conditions are detected. Conversely, when when the frequency at which the damping force of each of the shock absorbers 2FL, 2FR, 2RL, 2RR is switched over in a certain period of time is lower than the average frequency at which the damping forces of the shock absorbers 2FL, 2FR, 2RL, 2RR are switched over, the threshold values are corrected so as to increase the sensitivity with which bumpy road conditions are detected.

Consequently, those shock absorbers which have a higher damping force switchover frequency are controlled so that the frequency will be progressively lowered, and those shock absorbers which have a lower damping force switchover frequency are controlled so that the frequency will be progressively increased, until finally the damping force switchover frequencies of the shock absorbers 2FL, 2FR, 2RL, 2RR are uniformized.

Therefore, even if the damping-force rate-of-change signals VFL, VFR, VRL, VRR indicative of the expanding/contracting accelerations of the shock absorbers 2FL, 2FR, 2RL, 2RR are different from each other owing to the different characteristics of the piezoelectric load sensors 31FL, 31FR, 31RL, 31RR and the detectors 41FL, 41FR, 41RL, 41RR, the damping force switchover frequencies of the shock absorbers 2FL, 2FR, 2RL, 2RR are uniformized for well controlling riding comfort of the motor vehicle at all times.

In the above illustrated embodiment, the corrective values $\Delta V1$, $\Delta V2$ for correcting the threshold values, i.e., the upper and lower limits Vref1FL, Vref2fl are of preset values. However, the corrective values $\Delta V1$, $\Delta V2$ may be determined depending on the difference between the damping force switchover frequency of each shock absorber and the average damping force switchover frequency According to such a modification, the damping force switchover frequency can be uniformized faster because the upper and lower limits Vref1FL, Vref2FL are corrected to a larger extent as the damping force switchover frequencies of the shock absorbers 2FL, 2FR, 2RL, 2RR are different from each other to a greater extent.

Figure 11A:
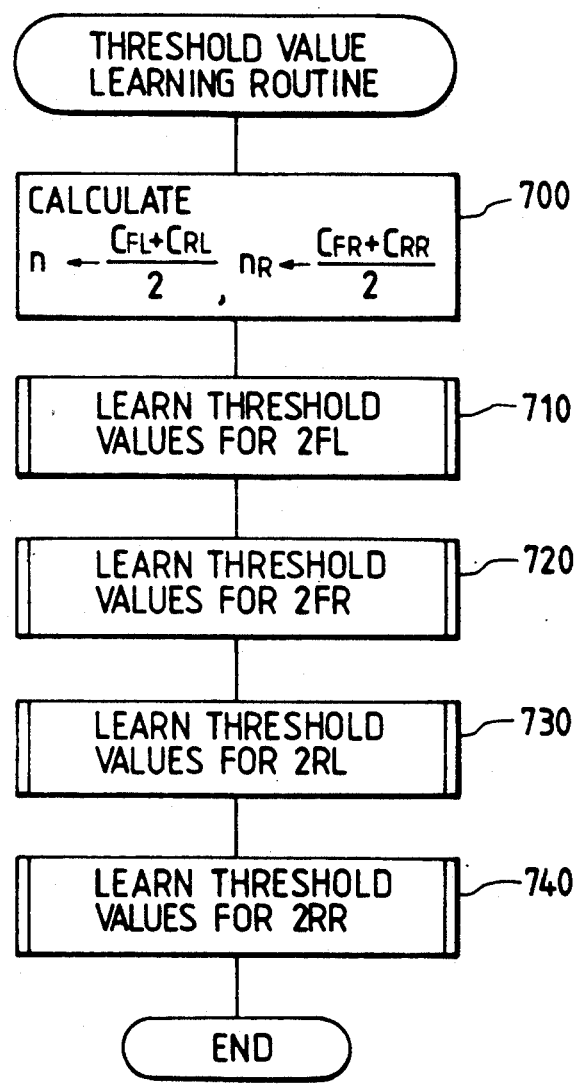
FIGS. 11A and 11B are a flowchart of another threshold level learning process.
Figure 11B:
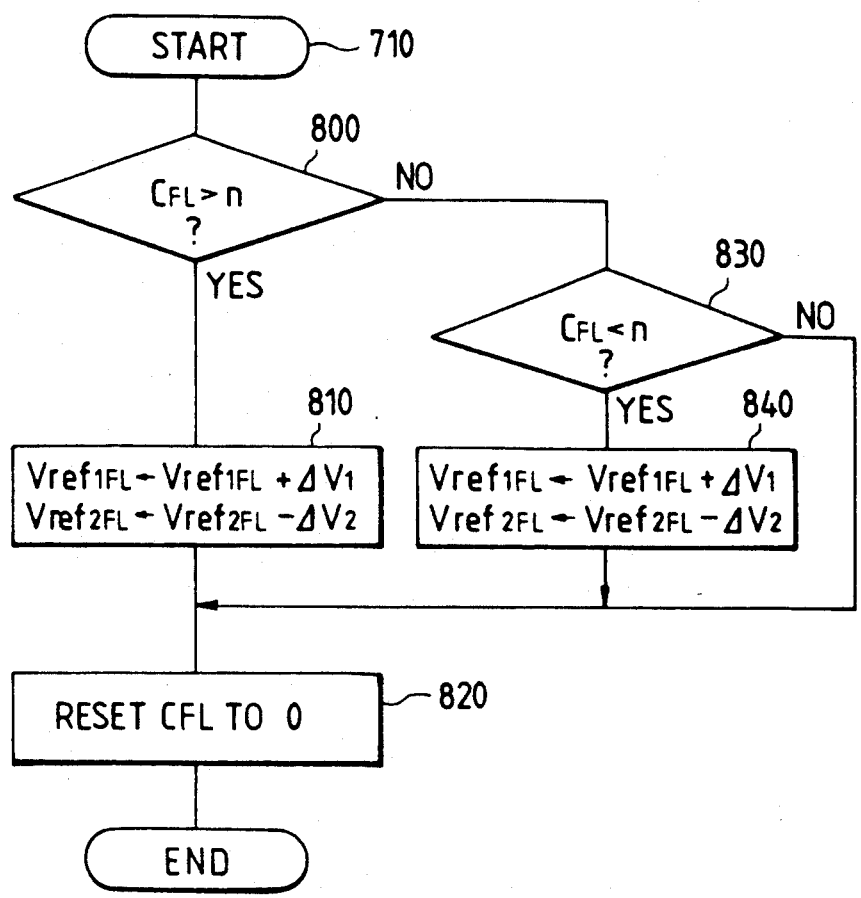

In the above embodiment, the threshold values are corrected so that the damping force switchover frequencies of the shock absorbers 2FL, 2FR, 2RL, 2RR are uniformized. Actual roads are usually more bumpy on shoulders than on centers. Therefore, the threshold values for the left and right shock absorbers may independently be corrected as shown in steps 700 through 740 in FIG. 11A and steps 800 through 840 in FIG. 11B. The steps 800 through 840 show the process of correcting the threshold values for the shock absorber 2FL. The threshold values for the shock absorbers 2FR, 2RL, 2RR are also corrected in the same manner as shown in FIG. 11B, using average switchover counts nR, nL, nR, respectively Well paved roads such as express highways are not bumpy and are very smooth. When the motor vehicle runs on such smooth roads, it is desirable that the damping force switchover frequencies of all the shock absorbers 2FL, 2FR, 2RL, 2RR be uniformized.

FIG. 12 shows a process of correcting the threshold values under such circumstances. First, a step 500 calculates an average vehicle speed Sa of the motor vehicle from the previous threshold value learning cycle up to the present threshold value learning cycle. Then, a step 510 determines whether the average vehicle speed Sa is equal to or higher than a predetermined speed So (e.g., 60 km/h) or not, thereby determining whether the motor vehicle is running on an express highway or not. If it is determined that the motor vehicle is running on an express highway, then the threshold values (upper and lower limits) are corrected based on the average count of damping force switchovers of all the shock absorbers in a step 520 in the same manner as described above with reference to FIGS. 10A and 10B. If it is determined that the motor vehicle is not running on an express highway, then the average count of damping force switchovers of the front and rear shock absorbers on each of the left and right sides is determined, and then the threshold values (upper and lower limits) for the front and left shock absorbers on each of the left and right sides are corrected in steps 530, 540.

When the threshold values for the left and right shock absorbers are corrected independently of each other, it may not be necessary to calculate the average count of damping force switchovers of the front and rear shock absorbers on each of the left and right sides. Rather, each time the damping force of one of the front and rear shock absorbers is switched over, it may be confirmed how the damping force of the other shock absorber is switched over, and the threshold values (upper and lower limits) may be corrected for each bump on the road over which the motor vehicle runs.

Figure 13:
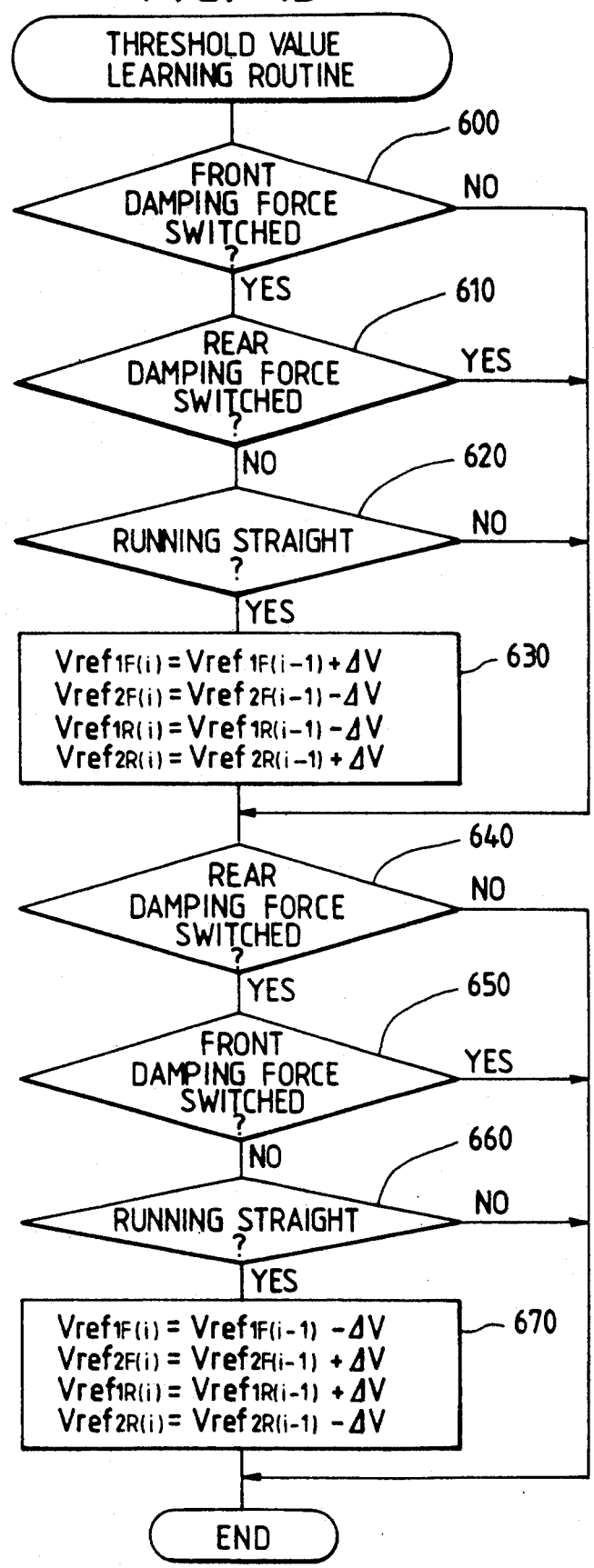

For such a modified control process, a routine for calculating the threshold values as shown in FIG. 13 may repeatedly be executed, together with the damping force switchover process, for the shock absorbers on each of the left and right sides of the motor vehicle.

According to the process shown in FIG. 13, a step 600 determines whether the damping force of the front shock absorber is switched over to a low level. If switched over to a low level, then a step 610 determines whether the damping force of the rear shock absorber is also switched over to a low level after the motor vehicle has run over a distance equal to the wheelbase thereof. If not switched over, then a step 620 determines whether the motor vehicle is running straight ahead. If the motor vehicle is running straight, the threshold values Vref1F, Vref2F and Vref1R, Vref2R for the front and rear shock absorbers are corrected in a step 630 according to the following equations:

$$Vref1F(i) = Vref1F(i-1) + \Delta V$$

$$Vref2F(i) = Vref2F(i-1) - \Delta V$$

$$Vref1R(i) = Vref1R(i-1) - \Delta V$$

$$Vref2R(i) = Vref2R(i-1) + \Delta V$$

Then, a step 640 determines whether the damping force of the rear shock absorber is switched over to a low level. If switched over to a low level, then a step 650 determines whether the damping force of the front shock absorber is also switched over to a low level after the motor vehicle has run over a distance equal to the wheelbase thereof. If not switched over, then a step 660 determines whether the motor vehicle is running straight ahead. If the motor vehicle is running straight, the threshold values Vref1F, Vref2F and Vref1R, Vref2R for the front and rear shock absorbers are corrected in a step 670 according to the following equations:

$$Vref1F(i) = Vref1F(i-1) - \Delta V$$

$$Vref2F(i) = Vref2F(i-1) + \Delta V$$

$$Vref1R(i) = Vref1R(i-1) + \Delta V$$

$$Vref2R(i) = Vref2R(i-1) - \Delta V$$

In the above threshold learning process, the steps 630, 670 correct the threshold values for the front and rear shock absorbers after the steps 620, 660 have confirmed that the motor vehicle is running straight ahead. This is because when the motor vehicle is making a turn, the front and rear road wheels move along different paths on the road, and hence the front and rear shock absorbers do not expand and contract in the same manner. The straight running of the motor vehicle may be detected by detecting the steered condition of the steering wheel of the motor vehicle. The steered condition may be detected by a steered angle sensor which detects an angle through which the steering wheel is turned.

The threshold values thus learned may be stored in a backup memory in the electronic controller 4 so that the stored threshold values will not be erased even after the ignition key is turned off.

Figure 14A:
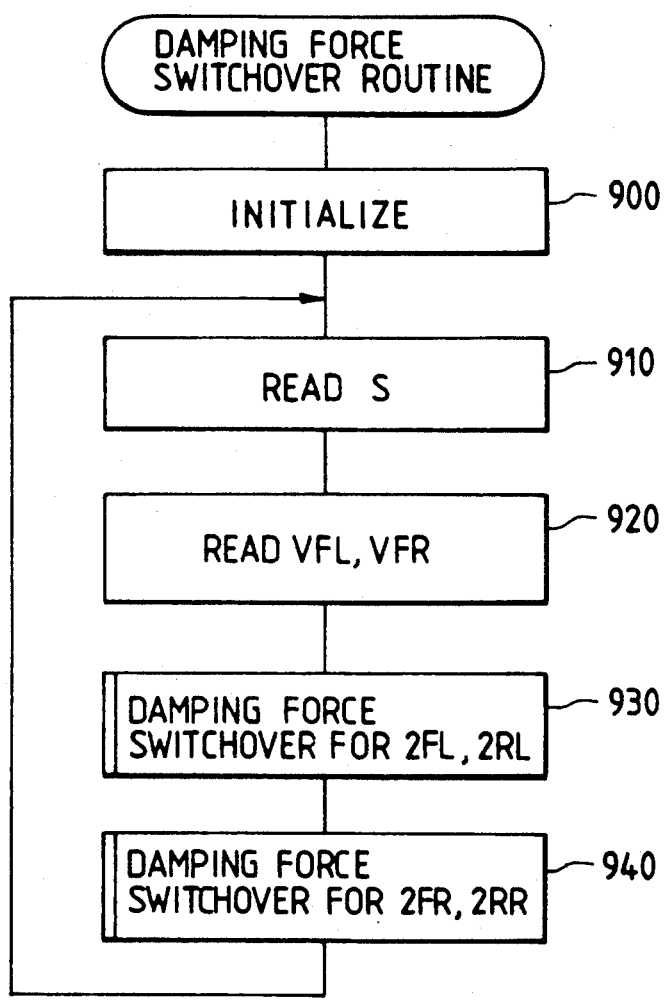
FIGS. 14A and 14B are a flowchart of another damping force varying process.
Figure 14B:
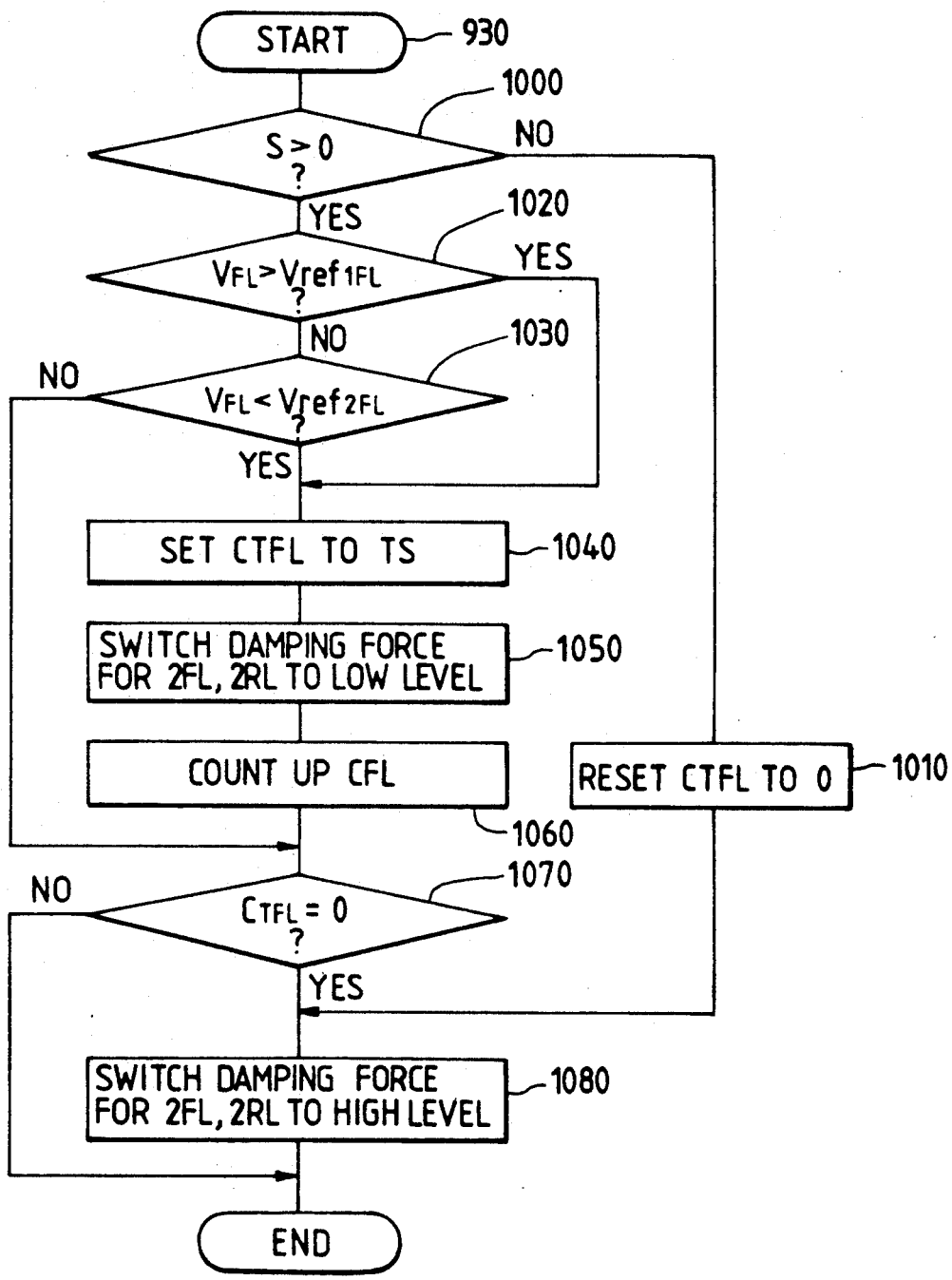
Figure 15:
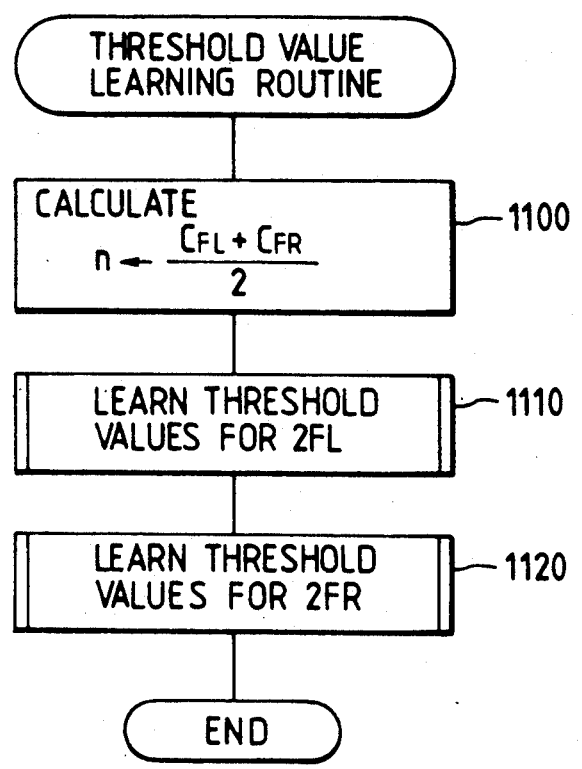
FIG. 15 is a flowchart of yet another threshold level learning process.

While the piezoelectric sensors are incorporated in the respective shock absorbers in the illustrated embodiment, they may be incorporated in only the front left and right shock absorbers. With such a modified arrangement, the damping forces are switched over according to a process indicated by steps 900 through 940 in FIG. 14A and steps 1000 through 1080 in FIG. 14B, so that the front and rear shock absorbers on each of the left and right sides are commonly controlled. The threshold values are learned according to a process indicated by steps 1100 through 1120 in FIG. 15, in which the average count n of damping force switchovers of only the front shock absorbers is determined in the step 1100. The steps 1110, 1120 are the same as the process of FIG. 10B.

While the average count n of damping force switchovers is employed as a reference value for determining damping force switchover frequencies, a fixed value may instead be used as such a reference value.

Although certain preferred embodiments have been shown and described, it should be understood that many changes and modifications may be made therein without departing from the scope of the appended claims.

What is claimed is:
1. A damping force control system in a motor vehicle having a motor vehicle body and road wheels rotatably supported on the motor vehicle body, said damping force control system comprising:
front left, rear left, front right, and rear right shock absorbers coupled between a motor vehicle body and the respective road wheels and having damping force modes selectively variable into at least two levels;
detecting means, operatively coupled with said shock absorbers, for detecting the accelerations of expansion and contraction of at least two of said front left, rear left, front right, and rear right shock ab- sorbers, respectively, said detected accelerations being representative of rates of change of damping forces in each of said at least two shock absorbers, respectively;

control means, in communication with said detecting means, for comparing said detected accelerations of expansion and contraction with a preset reference acceleration for each of said at least two shock absorbers, respectively, and for individually selecting said damping force modes of each of said at least two shock absorbers as a result of the comparison by said control means;

comparing means, capable of monitoring the output of said control means for calculating a frequency of selection of said damping force modes of each of said at lest two shock absorbers by said control means, in a predetermined period of time, and for comparing each of said calculated frequencies with a reference frequency; and correcting means for correcting each of said preset reference accelerations individually as a result of the comparison by said comparing means so that one of the following will occur, said damping force modes of each of said at least two shock absorbers will be selected at a uniform frequency by said control means and damping force modes of the front left and rear left shock absorbers and the damping forces of the front right and rear right shock absorbers will be selected at a uniform frequency by said control means.

2. A damping force control system according to claim 1, wherein said detecting means comprises means for detecting the accelerations of expansion and contraction of all of said shock absorbers, and said comparing means comprises means for averaging the frequencies of selection over of the damping force modes of all of said shock absorbers and for employing the average frequency as said reference frequency, and wherein said correcting means comprises means for increasing or reducing said preset accelerations so that the damping force modes of all of said shock absorbers will be switched over at said uniform frequency.

3. A damping force control system according to claim 1, wherein said detecting means comprises means for detecting the accelerations of expansion and contraction of all of said shock absorbers, and said comparing means comprises means for averaging the frequencies of selection over of the damping force modes of said front left and rear left shock absorbers and the frequencies of selection over of the damping force modes of said front right and rear right shock absorbers and for employing each of the average frequencies as said reference frequency, and wherein said correcting means comprises means for increasing or reducing preset accelerations so that the damping force modes of the front left and rear left shock absorbers and the damping forces of the front right and rear right shock absorbers will be selected at said uniform frequency.

4. A damping force control system according to claim 1, wherein said detecting means comprises means for detecting the accelerations of expansion and contraction of the front left and front right shock absorbers, and said comparing means comprises means for averaging the frequencies of selection over of the damping force modes of said front left and front right shock absorbers for employing the average frequency as said reference frequency, and wherein said correcting means comprises means for increasing or reducing said preset accelerations so that the damping force modes of the front left and front right shock absorbers will be selected at said constant frequency, and said control means comprises means for selecting the damping force modes of the front left and front right shock absorbers to one of said two levels, and for selecting the damping force modes of the rear left and rear right shock absorbers to one of said two levels.

5. A damping force control system in a motor vehicle having a motor vehicle body and front and rear road wheels rotatably supported on the motor vehicle body, said damping force control system comprising:

shock absorbers coupled between a motor vehicle body and the respective front and rear road wheels and having damping force modes, selectively variable into at least two levels;

detecting means, operatively coupled to said shock absorbers, for detecting accelerations of expansion and contraction of said shock absorbers;

control means for comparing said detected accelerations of expansion and contraction with preset accelerations respectively, for individually selecting said damping forces modes of said shock absorbers as a result of the comparison by the control means, and for determining if the motor vehicle is running straight ahead;

selection comparing means for comparing a selection condition of said damping force modes of said shock absorbers associated with said front road wheels with a selection condition of said damping forces of the shock absorbers associated with the rear road wheels while the motor vehicle is running straight ahead; and correcting means for correcting said preset accelerations as a result of the comparison by said selection comparing means so that said damping force mode of said shock absorbers associated with the front and rear road wheels will be switched over to one of said two levels by said control means while the motor vehicle is running straight ahead.

* * * * *